(12) United States Patent
Boom et al.

(10) Patent No.: US 12,022,136 B2
(45) Date of Patent: Jun. 25, 2024

(54) TECHNIQUES FOR PROVIDING INTERACTIVE INTERFACES FOR LIVE STREAMING EVENTS

(71) Applicant: Amazon Technologies, Inc., Seattle, WA (US)

(72) Inventors: Steve John Boom, Atherton, CA (US); David Hikaru Nakayama, Palo Alto, CA (US)

(73) Assignee: Amazon Technologies, Inc., Seattle, WA (US)

( * ) Notice: Subject to any disclaimer, the term of this patent is extended or adjusted under 35 U.S.C. 154(b) by 38 days.

(21) Appl. No.: 16/914,954

(22) Filed: Jun. 29, 2020

(65) Prior Publication Data
US 2021/0409787 A1   Dec. 30, 2021

(51) Int. Cl.
*H04N 21/2187* (2011.01)
*H04N 21/258* (2011.01)
*H04N 21/4788* (2011.01)

(52) U.S. Cl.
CPC ... *H04N 21/2187* (2013.01); *H04N 21/25883* (2013.01); *H04N 21/25891* (2013.01); *H04N 21/4788* (2013.01)

(58) Field of Classification Search
CPC ......... H04N 21/2187; H04N 21/25883; H04N 21/25891; H04N 21/4788
USPC ......................................................... 709/231
See application file for complete search history.

(56) References Cited

U.S. PATENT DOCUMENTS

| 11,245,947 B1* | 2/2022 | Sabo ................ H04N 21/25841 |
| 2007/0274534 A1* | 11/2007 | Lockhart ................ H04R 3/005 381/92 |
| 2011/0225519 A1 | 9/2011 | Goldman et al. |
| 2014/0067834 A1 | 3/2014 | Hutten |
| 2014/0150042 A1* | 5/2014 | Pacor ................ H04N 21/2187 725/116 |
| 2014/0229866 A1* | 8/2014 | Gottlieb ................... H04N 7/15 709/204 |
| 2015/0088622 A1 | 3/2015 | Ganschow |
| 2016/0093020 A1* | 3/2016 | Basalamah .......... H04N 5/2628 345/634 |

(Continued)

OTHER PUBLICATIONS

Application No. PCT/US2021/025590, International Search Report and Written Opinion, dated Jun. 14, 2021, 12 pages.

*Primary Examiner* — Suraj M Joshi
(74) *Attorney, Agent, or Firm* — Kilpatrick Townsend & Stockton LLP

(57) ABSTRACT

Techniques are described herein for providing an interactive interface for live streaming events. A user may view a broadcasted live streaming event via the interactive interface. A sub-group of participants of the live streaming event may be identified from a larger group of participants based at least in part on respective locations of respective computing devices of the sub-group participants. A graphical representation can be generated for the group using images of each of the sub-group participants. A selection of the sub-group can be received from the interactive interface and the graphical representation can be presented in response to receiving the selection. Various features of the interactive interface provide for a more enriching experience for both the performer(s) and viewing participants of the broadcasted live streaming event.

20 Claims, 10 Drawing Sheets

(56) References Cited

U.S. PATENT DOCUMENTS

2016/0198223 A1\* 7/2016 Maluk ................ H04N 5/44591
709/206

\* cited by examiner

TECHNIQUES FOR PROVIDING INTERACTIVE INTERFACES FOR LIVE STREAMING EVENTS

BACKGROUND

Streaming is a technology that is used to deliver live or real-time content to computers and mobile devices over the Internet. A computing device transmits data (e.g., audio and/or video data) as a continuous flow, which allows recipients to begin watching and/or listening almost immediately without requiring the content to be entirely downloaded onto a client device first. By way of example, a live concert can be broadcast to many computing devices of the concert's participants. Little, if any, interaction is possible between the performer(s) and their audience.

BRIEF DESCRIPTION OF THE DRAWINGS

Various embodiments in accordance with the present disclosure will be described with reference to the drawings, in which.

DETAILED DESCRIPTION

Figure 1:
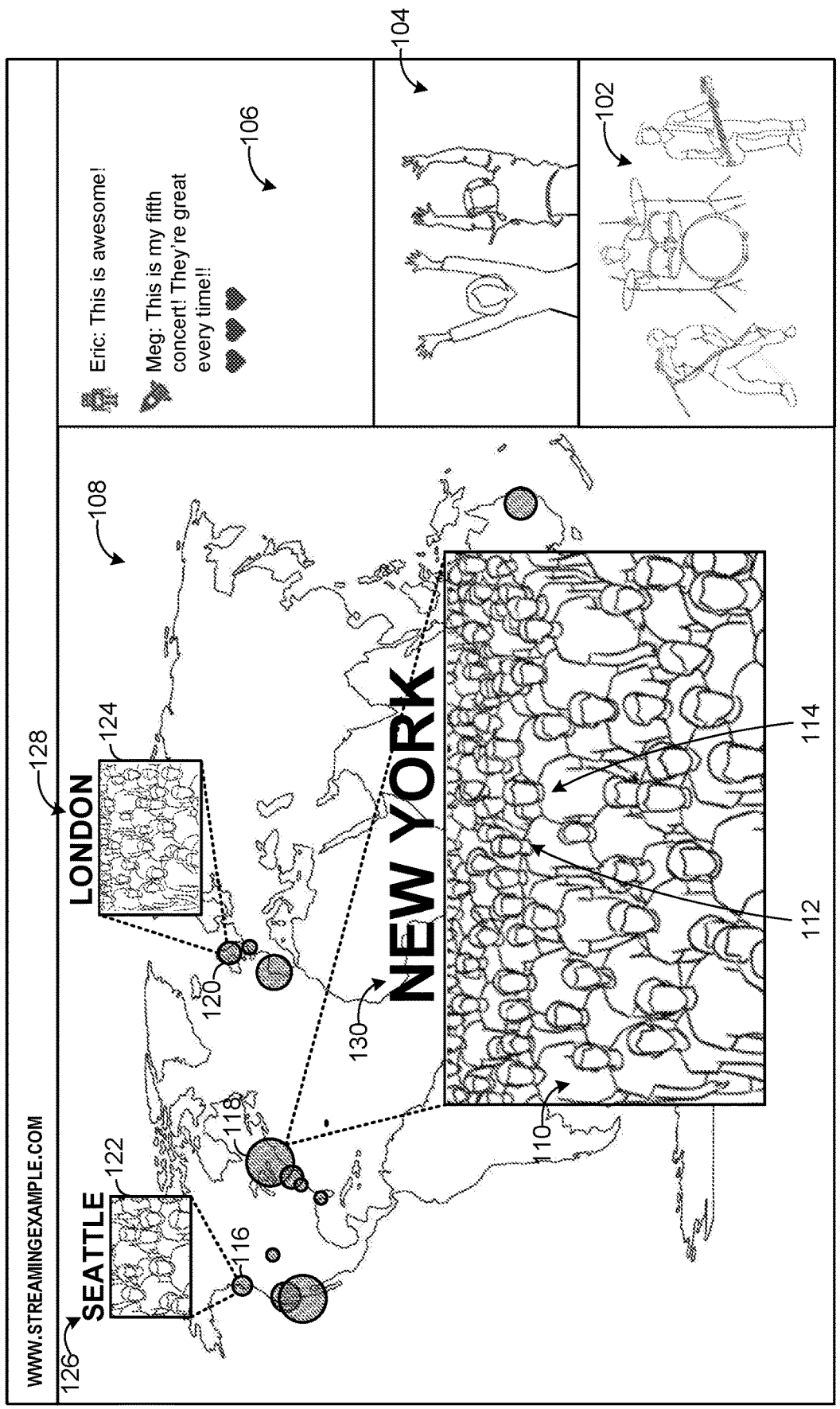
FIG. 1 is a block diagram illustrating an example presenter/performer view of an interactive interface for presenting aspects of a broadcasted live streaming event, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein are directed to providing interactive user interfaces (also referred to as interactive interfaces for brevity) for performers/presenters and/or participants (e.g., viewers) of live streaming events (e.g., broadcast events). Live streaming includes the broadcasting of an event occurring live (e.g., occurring at a current time and sometimes without edits) by transmitting packets including a few seconds of the content at a time over the Internet. In some embodiments, the live event may be captured by multiple cameras (e.g., a filming crew at a venue) of various cameras at a respective performer's location (e.g., at the performer's home, studio, etc.). These packets can be received by one or more computing devices of the event participants and played at the devices such that the participants may watch the event in substantially real time. The term "performer(s)" may be utilized herein to refer to any suitable content provider(s) (e.g., presenters, lecturers, speakers, sports teams, bands, musical groups, etc.) that appear in the live streaming event. The term "participant" may be utilized to refer to any user that participates as a viewer of the live streaming event. An "interactive user interface" is intended to refer to a user interface that provides one or more graphical elements (e.g., visual indicators, graphical representations, etc.) with which a user (e.g., a performer, a participant, etc.) may interact. These interactions may enable the user to ascertain various aspects of the live streaming event and/or other participants of the live streaming event.

In some embodiments, a rock band (an example of a performer) may stream a live musical concert to many concert participants (e.g., 5,000 concert participants, 10,000 concert participants, etc.). In some cases, viewing of the concert may be conditioned on purchasing a ticket for the event. In conventional systems, a performer of a live streaming event has little feedback regarding reactions by the event participants to the content he provides. At most, a performer might be able to view some images of some of the users. However, what images and how many images are provided are usually outside of the performer's control and the images provided offer little by way of usable feedback for the performer as to the effect of his performance. For large events, with hundreds or even thousands of users, the performer has conventionally little available to him to obtain feedback from the event participants or to comprehend aspects of the participants such as where the participants are located, demographics of the participants, or any suitable shared attributes of the participants. It is likely that, conventionally, a performer with a relatively large audience (e.g., over 20 users, over 100 users, etc.) may receive little or no visual or audible feedback from the event participants. This can negatively impact the performer's performance as the performer is unable to utilize such feedback to adjust his performance.

The techniques disclosed generate and provide an interactive interface that may be utilized by the performer of a live streaming event to obtain visual and/or audible feedback from the participants of a live streaming event. By way of example, an interactive interface may be generated and/or provided (e.g., by the interactive interface engine 602 of FIG. 6, discussed below) that graphically depicts location and/or location density of the participants and input volume corresponding to audible feedback (e.g., cheering, clapping, etc. as provided in video and/or audio feeds) of the event participants (or at least some of the event participants). In some embodiments, a performer may view a map and/or list corresponding to various sub-groups of participant. For example, a large number of participants of a live streaming concert may be located near (e.g., within a threshold distance) of a major metropolitan city, within a geographical region (e.g., a city, state, country, etc.) defined by a boundary, and the like. In some embodiments, the interactive interface may graphically present a visual indication of a number of participants that correspond to a given location and/or area. For example, a visual indicator may include an interface element (e.g., a circle or other suitable shape) that has a size (e.g., a diameter, total area, etc.) and/or a label (e.g., a number) that is determined based at least in part on how many participants are located within a threshold distance of a common location (e.g., Seattle, London, etc.) and/or within a common boundary (e.g., a boundary of a state, country, city, town, county, parish, etc.). In some embodiments, the visual indicator may appear larger when the number of participants of the event is greater than the size of the visual indicator when there are a fewer number of participants nearby (e.g., near the location and/or within the boundary). In some embodiments, the size of the visual indicator may be determined based at least in part on a function that includes the number of participants in the sub-group as a variable. Although examples are provided herein that utilize a visual indicator to indicate size and/or a collective sound, in some embodiments, any suitable combination of a size of the sub-group, a collective sound produced by at least a portion of the sub-group, a collective action performed by at least some users of the sub-group (e.g., cheering, jeering, dancing, jumping, etc.), or any suitable collective attribute of the sub-group may be indicated by the visual indicator.

It should be appreciated that a sub-group of users may be identified based at least in part on the user's location, one or more demographics (e.g., age, gender, marital status, income, education level, or the like), familial relationships, affiliations (e.g., to a company, an organization, a charity, a club, etc.), physical attributes (e.g., brown eyes, black hair, etc.) and/or any suitable combination of one or more attributes of the users and/or any suitable combination of one or more attributes of the users. Although examples herein may utilize respective locations of the users to identify various sub-group, any suitable attribute associated with the users may be additionally, or alternatively, utilized to identify sub-groups of users. In some embodiments, the attributes utilized by the interactive interface engine to identify the sub-groups may be user configurable (e.g., the user may select the attribute(s) with which sub-groups will be identified).

Similarly, the interactive interface engine may utilize a visual indicator to represent input volume (e.g., a loudness) of audible feedback provided by the participants corresponding to a given location (e.g., participants of a given sub-group). By way of example, the interactive interface engine may set the size of a visual indicator to correspond to a loudness value (e.g., a decibel value, an average decibel value calculated from the collective input volume of the audio feedback of the participants of the sub-group, etc.) or otherwise indicate a loudness of the audio feedback of at least some of the participants. The audio feedback may be any suitable audio input (e.g., received as part of a video and/or audio feed). In some embodiments, different visual indicators or a common visual indicator may be utilized to indicate participant density (e.g., how many participants are associated with a given location) and input volume. Thus, in some embodiments, the performer may visually ascertain how many people are generally in a given area and/or generally how loud those people are currently being (individually, collectively, or with respect to others). Although a size of the visual indicator is used for illustrating one way in which participant density and/or input volume can be depicted, the visual indicators may depict the same information in other ways such as by varying the color, shape, opacity, or any suitable attribute of the visual indicator.

In some embodiments, the interactive interface engine may be configured to generate different interface features in response to receiving user input. By way of example, the performer may select (e.g., via touch input, via a mouse click, etc.) a particular graphical element (e.g., a circle) corresponding to a particular location to view at least some images of the participants corresponding to that location. In some embodiments, the selectable graphical element may be the visual indicators discussed above. At any suitable time, the interactive interface engine may obtain (e.g., from user profile data, from video feeds provided by the even participants, etc.) one or more images and/or video (referred to as visual input) corresponding to a sub-group of the participants of the event. In some embodiments, the sub-group may correspond to a particular location and/or boundary, demographic, familial relationship, affiliation, and/or any suitable combination of one or more attributes of the users. The interactive interface engine may combine the images and/or video to generate the graphical representation of the sub-group. In some embodiments, the graphical representation may resemble a physical crowd as would be seen by a performer from a physical stage were the performance being held in a stadium/concert hall, etc. The interactive interface engine may enable the performer to zoom in or out or pan within the graphical representation based on user input as will be described in further detail below. In some embodiments, a number of predefined operations may be performed to automatically select a sub-group, zoom in/out, and/or pan within in the graphical representation. By way of example, by identifying the performer uttered the identifier of a sub-group and/or by determining the sub-group is the largest and/or loudest of all the sub-groups, the interactive interface engine may be configured to automatically select the sub-group and perform a series of predefined zoom in/out and/or pan operations of the graphical representation. In some embodiments, the graphical representation may be animated (or at least part of the graphical representation may be animated) as discussed herein to represent movement provided by the participants and determined from the participants video feeds. As the performer views the graphical representation, he may be informed of the effect his performance is having on the participants of a particular sub-group and in some embodiments, the information may be provided independent of user input of the performer.

In some embodiments, the interactive interface engine may generate a feature window within the interactive interface. The feature window may feature one or more images (e.g., a current video feed) of one or more participants. In some embodiments, particular participants may be selected for the feature window based at least in part on any suitable combination of user attributes. By way of example, user profile data of a given participant may be analyzed to identify that the participant has a particular designation, membership, or class. By way of example, the participant's user profile data may indicate the participant's membership in the performer's fan club and the interactive interface engine may be configured to select participants for the feature window that are identified as being associated with this membership. Thus, in some embodiments, the feature window may feature the images and/or video feeds members of the fan club, each for some period of time (e.g., 10 seconds, 30 seconds, etc.). In some embodiments, participants may be provided the ability to purchase feature time in the feature window. In some embodiments, participants may be selected for the feature window based at least in part on an amount of motion and/or loudness determined from their corresponding video feeds. Thus, a participant's image and/or video feed may be featured in the feature window based at least in part on determining that the participant is more animated and/or louder than other participants (e.g., all other participants, all other participants in the participant's sub-group, etc.).

In some embodiments, the interactive interface engine may generate an interactive interface for the participants of the live streaming event. This interface may include one or more chat windows. One chat window could present chat input corresponding to a chat including all of the participants of the event. In some embodiments, the chat window (or a different chat window) may provide the chat input corresponding to a chat that includes a smaller group of participants (e.g., the participants corresponding to a same location as the participant who is using the interface, referred to as "the user"). In some embodiments, a chat window may present a chat corresponding to a set of chat participants that are specified by user input (input provided by the participant using the interface, referred to herein as the "participant user"). In some embodiments, the chat window may correspond to other participants which are also associated with the user via one or more social media websites (e.g., who are "friends" with respect to a particular social media website). In some embodiments, the chat window may correspond to a chat including any suitable number of participants identified based at least in part on the sub-group, user input, and/or social media data indicating friends/acquaintances of the user.

In addition to viewing the live event, the participant user may also be presented one or more interface elements that are also provided to the performers. By way of example, the participant user may also find an interface element for viewing and ascertaining various aspects of the many participants of the event.

By utilizing the techniques provided herein, the experience of both the performer(s) and the participants are enriched. While the live streaming event is occurring virtually (or during subsequent playback of the event), the interactive interface elements provided herein enable the performer(s) and participants to experience aspects of the event that are more similar to those experienced when in physical attendance. Additionally, the interactive interfaces discussed herein may be utilized to enable performers/participants to learn more about and/or experience the reactions of a wide variety of participants to the live streaming event.

FIG. 1 is a block diagram illustrating an example presenter/performer view of an interactive interface 100 for presenting aspects of a broadcasted live streaming event, in accordance with at least one embodiment. As used herein, a broadcasted live streaming event (also referred to as a "live streaming event" for brevity) can include any suitable event that is broadcasted live (e.g., a near real time, as the event is occurring, etc.) via any suitable streaming protocol. Example live streaming events may include sporting events, musical concerts, lectures, speeches, and the like. Interactive interface 100 may be generated and/or provided by a live streaming platform. In some embodiments, the interactive interface 100 may correspond to a performer's view of the live streaming event being broadcasted.

Although FIG. 1 depicts an example in which users are grouped by location, other attributes of the users may be similarly utilized to identify sub-groups of users (e.g., based at least in part on one or more demographics (e.g., age, gender, marital status, income, education level, or the like), familial relationships, affiliations (e.g., to a company, an organization, a charity, a club, etc.), and/or any suitable combination of one or more attributes of the users). Thus, the sub-groups could represent age groups, gender groups, marital status groups, income groups, occupation groups, and the like, where users of a group are associated with a common attribute.

As depicted in FIG. 1, the interactive interface 100 may include viewing area 102 which can present video and/or audio of the live streaming event being broadcasted. The viewing area 102 (and/or any area or window described herein) may be any suitable size and may be positioned within the interactive interface 100 at any suitable location, not necessarily the one depicted in FIG. 1. In some embodiments, user input may be provided to resize the viewing area 102 (and/or any area or window described herein) to any suitable size. In some embodiments, user input may be provided via the interactive interface 100 to hide presentation or add presentation of the viewing area 102 (and/or any area or window described herein). By way of example, a menu option (not depicted) may be provided within the interactive interface 100 and/or the option may be provided in response to selection of the viewing area 102 (and/or any area or window described herein) and/or the option may be provided in response to right clicking a mouse within the viewing area 102 (and/or any area or window described herein) or within interactive interface 100. As depicted in FIG. 1, and potentially by default, the viewing area 102 (and/or any area or window described herein) is presented within the interactive interface 100. Should the user choose to hide the viewing area 102 (and/or any area or window described herein), the remaining portions of the interactive interface (e.g., feature window 104, chat window 106, participant window 108, or any portion of the interactive interface) may be resized according to a predetermined protocol so as to utilize the space once used for the viewing area 102 for other purposes.

In some embodiments, the interactive interface 100 may include a feature window 104. Feature window 104 may be configured to present one or more images and/or video feeds corresponding to one or more participants (e.g., viewers of the live streaming event). In some embodiments, the participant(s) featured in feature window 104 may be selected randomly and/or the participant(s) may be selected based at least in part on a predetermined selection criteria. By way of example, user profile data corresponding to the participants of the live streaming event may be obtained and analyzed to identify participants that are associated with a designation, membership, and/or classification. By way of example, a participant who is part of a fan club associated with the performer may be classified as a "fan." In some embodiments, the classification can be one of many in a predetermined hierarchical scheme. For example, a participant of one level of membership in a fan club may be classified as a "top fan" while another may be classified as a "new fan." In some embodiments, a participant may be classified as being eligible for feature selection based at least in part on a fee (e.g., a membership fee, a one-time fee) previously paid by the participant, according to a duration of time during which the participant has been associated with a designation/membership/classification, a number of events associated with the performer(s) that have been attended by the participant, according to a total cost associated with previously purchased fan merchandise, and the like. As a non-limiting example, a participant who has paid a membership fee (or a greater membership fee) can be classified with a higher designation than one who has not paid a membership fee (or at least a lesser membership fee). Similarly, a participant that has attended a number of events associated with the performer(s) that is over some threshold number may be classified with a designation/classification that is different from (e.g., higher) than a designation/classification associated with a participant that has attended a number of events that is less than the threshold number. In some embodiments, the participant(s) featured in feature window 104 may be selected from a group of participants that share a particular classification. By way of example, featured participants may be selected from all of the participants that are classified as "top fans." In some embodiments, the featured participants may be presented in the feature window 104 according to a predetermined and/or configurable time period (e.g., 30 seconds, 15 seconds, etc.). The particular selection criteria used to select participants to feature in the feature window may vary and, in some cases, may be configurable (e.g., configurable by the performers or agents of the performers, etc.).

In some embodiments, the participant(s) featured in feature window 104 may be selected based at least in part on motion detected from a corresponding video feed. For example, a participant's device (e.g., a user device) may provide a video feed to the live streaming platform as part of participation in the live streaming event. The video feed may be analyzed to identify that subjects of the video feed are moving in a manner that meets a predetermined threshold and/or criteria. For example, the participants could be generally dancing, moving, clapping, and the like. In some embodiments, participants may be featured in the feature window 104 based at least in part on determining, from a corresponding video feed, that the participants are performing over a threshold amount of movement, that the participants are performing one or more particular types of movement (e.g., clapping, dancing, jumping, hand waving, etc.), that the participants are performing more movement than any other participants, or according to any suitable selection criteria.

In some embodiments, the participant(s) featured in feature window 104 may be selected based at least in part on sound detected from a corresponding video and/or audio feed. For example, a participant's device (e.g., a user device) may provide audio input via a video and/or audio feed to the live streaming platform as part of participation in the live streaming event. The audio input may be analyzed to identify that subjects of the video feed are producing sound that meets a predetermined threshold and/or criteria. For example, the participants could be cheering, yelling, singing, and the like. In some embodiments, participants may be featured in the feature window 104 based at least in part on determining, from a corresponding audio input, that the participants are providing at least a threshold amount of sound, that the participants are providing particular types of sound (e.g., clapping, cheering, singing, etc.), that the participants are producing more sound than any other participants, or according to any suitable selection criteria.

In some embodiments, the participant(s) featured in feature window 104 may be selected based at least in part on paying a predetermined fee. By way of example, the live streaming platform may provide a purchase interface (not depicted) that enables a participant to purchase feature time in the feature window 104. In some embodiments, this feature time may occur at any suitable time during the live streaming event or according to a schedule.

In some embodiments, the participant(s) featured in feature window 104 may be selected by the user (e.g., the performer(s)) at any suitable time via any suitable graphical representation discussed in more detail below. It should be appreciated that participants may be featured in the feature window 104 according to any suitable combination of factors described above (e.g., according to designation, memberships, classifications, movement, sound, paid fee, user selection, and the like).

In some embodiments, interactive interface 100 may include chat window 106 which may present chat input provided by any suitable combination of participants of the live streaming event. As depicted, each chat input may be labeled with an identifier of the participant that provided the chat input. The identifier may include any suitable combination of a name, a viewing location (e.g., a viewing location corresponding to a city, county, state, country, region, or the like), an image, an icon, and the like.

Interactive interface 100 may include participant window 108. In some embodiments, participant window 108 may depict, as shown in FIG. 1, a map corresponding to a region (e.g., a country, a city, the world, etc.). In some embodiments, the map may be predefined, but in other embodiments, the map may be generated based at least in part on the locations of the participants of the event. By way of example, a map that depicts an area corresponding to the locations of the respective participants of the live streaming event may be generated. Thus, if the participants are located worldwide, a world map may be presented. Similarly, if the participants are located within a particular country, the map presented may depict only that country. In some embodiments, if the participants are located in multiple regions, the participant window 108 may present multiple maps corresponding to those regions (e.g., a map of the U.S., a map of Europe, a map of Australia when the participants are located in the U.S., Europe and Australia, etc.).

Although some embodiments utilize a map to present information about participants, it should be appreciated that, in some embodiments, participant information (e.g., participant density, participant volume, etc.) may be differently presented such as in a list (not depicted). In some embodiments, the list may include various geographical locations corresponding to the participants (e.g., Seattle, Berlin, Perth, the U.S., England, etc.). In some embodiments, a map may not be utilized as a background, but the positioning of the various graphical elements, visual indicators, and/or graphical representations discussed herein may be similarly positioned as if a map was being utilized.

In some embodiments, the location of each of the participants of the live streaming event may be ascertained. By way of example, user profile data corresponding to a user account of the live streaming platform may be obtained. The user profile data may include a location (e.g., an address, a city, a country, etc.) for a given user (e.g., a particular participant). In some embodiments, a computing device with which the participant is viewing the live streaming event may provide (e.g., when requesting access to the live streaming event or at any suitable time) location data indicating a location (e.g., an address, a city, a country, a county, coordinates, etc.) at which the computing device is located. As yet another example, an interface element (not depicted) may be generated and provided to the user to obtain the user's location at any suitable time (e.g., when requesting access to the live streaming event, when purchasing a ticket corresponding to the live streaming event, or at any suitable time.

The participants of the live streaming event may be grouped into sub-groups according to their respective locations (e.g., as identified from user profile data, as identified from location data provided by the participant's device, as identified from input provided by the user, etc.). In some embodiments, the sub-group granularity may be determined based at least in part on a predetermined scheme. In some examples, the predetermined scheme may specify that each group should include a threshold percentage and/or number of participants. This threshold percentage and/or number may vary based at least in part on a total number of event participants. Thus, for an event with 100 participants, the group size might be specified as five participants, while a group size of 100 may be utilized for an event with 10,000 participants. In some embodiments, the participants may be grouped based at least in part on a distance between one another and/or a distance their location and a pre-specified location (e.g., a location corresponding to a city, state, country, etc.). In some embodiments, a number of region boundaries (e.g., corresponding to a city, county, state, country, etc.) may be pre-specified and participants may be grouped based at least in part on determining their location falls within a particular region's boundaries.

A graphical representation of each sub-group may be generated at any suitable time. As a non-limiting example, a graphical representation may include images, video, and/or avatars corresponding to each participant in a sub-group. An avatar can include any suitable icon or figure representing a particular person. Although not depicted in FIG. 1, a graphical representation of a sub-group could include stationary and/or non-stationary avatar representations of each participant in the sub-group. Each avatar may be selected from a number of pre-generated avatars, or at least some of the avatars may be defined by user input provided a corresponding participant. In some embodiments, the avatars may be stationary or animated to some degree. The animation provided may be predetermined and/or according to a predetermined protocol for combining and animating avatars. In some embodiments, a video feed provided by the participant's computing device may be utilized to generate an animation for the avatar. By way of example, motion of the participant may be detected via the video feed and a corresponding avatar may be animated in a manner such that the avatar, as animated, appears to mimic those motions. The avatars, whether stationary or animated, may be combined to visually depict a crowd corresponding the participants of the subgroup. By way of example, graphical representation 110 may, in some embodiments, include any suitable number of avatars (e.g., stationary or animated) that are combined to depict a crowd corresponding to a particular sub-group (e.g., the participants who are located within a threshold distance of the city of New York).

In some embodiments, a graphical representation of a sub-group may be generated by combining the video feeds of the participants associated with the sub-group. By way of example, any suitable image and/or facial recognition techniques may be utilized to identify a participant (or a portion of the participant such as the participants body and/or face) within an image (e.g., a still image and/or a frame of a video feed). The image may be cropped such that the participant, or portion of the participant (and/or objects attached to or held by the participant such as signs, lighters, smart phones, etc.), may be isolated. The cropped image may be inserted and/or overlaid atop an avatar (e.g., an avatar body) such that at least a portion of the participant is viewable. In some embodiments, a background of the image and/or video may be removed and/or normalized (e.g., modified to be the same as other participant's backgrounds such that every image/video of the participants of the sub-group are substantially similar). The cropped and/or modified images may be combined and positioned in various positions to create a graphical representation (e.g., an image or video frame) that mimics the appearance of a crowd made up of the participants if they were physically collocated. In some embodiments, the graphical representation includes various images of participants as obtained from the participant's video feeds positioned, resized, and/or otherwise modified to appear as if in a crowd of that sub-group's participants. For example, within graphical representation 110, the image or video feed of one participant may be utilized to generate the image of a person 112, while an image or video feed of another participant may be utilized to generated the image of the person 114. In some embodiments, at least a portion of the participant (e.g., the participant's body), as depicted in the graphical representation 110, may be part of an avatar generated by the system.

In some embodiments, a graphical representation of a sub-group may be generated by detecting a degree of motion and/or particular motions (e.g., dancing, clapping, hand waiving, etc.) from each participant's video feed (or a sampling of the video feeds of the sub-group of participants). Pre-generated avatars may be combined to visually represent a crowd corresponding to the participants and each avatar may be animated according to the degree of motion and/or particular motions detected from the various participants. Thus, an avatar corresponding to a participant who is dancing (as detected from the participant's video feed) can be placed in the graphical representation and animated to appear as if the avatar is moving (e.g., to a similar degree as the participant and/or in a similar manner as the participant, to mimic the motions of the participant, etc.).

In some embodiments, the computing devices of the participants may provide the system audio input (e.g., from an audio feed, from a video feed that includes an audio component, etc.) including sounds provided by the respective participants. In some embodiments, sounds that do not breach a predetermined threshold may be ignored. When sounds of the audio input do breach the predetermined threshold, the sounds may be combined to generate collective sound data that may be presented via a speaker of the performer's computer device such that the performer can hear the sounds provided by the participants. As a non-limiting example, participants may cheer and clap during a performance. The system may obtain these sounds, determine that they breach a predetermined threshold, and combine them to form a collective sound such that the performer can hear his audience applaud and cheer. In some embodiments, a sample of the audio inputs may be used to estimate a collective loudness value (e.g., a value quantifying how loud the audience is). In some embodiments, some of all of the audio inputs may be used to estimate an average loudness value which in turn could be used to identify a collective loudness value. In some embodiments, certain types of sounds (e.g., boos, cheers, etc.) may be identified from the audio input. In some embodiments, the system may be configured to present (e.g., via a speaker) prerecorded sounds (e.g., applause, cheers, boos, etc.) based at least in part on any suitable combination of the collective loudness value, the average loudness value, and/or the particular types of sounds detected in the audio input.

The participant window 108 may present any suitable number of graphical representations, identifiers, and/or visual indicators corresponding to each sub-group. By way of example, in some embodiments, a number of visual indicators (including visual indicator 116, visual indicator 118, and visual indicator 120) may be presented, each visual indicator corresponding to a particular sub-group of participants. As depicted, visual indicator 116 corresponds to a sub-group of participants associated with Seattle, visual indicator 118 corresponds to a sub-group of participants associated with London, and visual indicator 120 corresponds to a sub-group of participants associated with New York.

In some embodiments, the visual indicator could be a number (or include a number) that indicates the number of participants associated with a particular sub-group. A size of the visual indicator may additionally or alternatively indicate a size of the sub-group (e.g., a number of participants associated with the sub-group). Thus, visual indicator 116 may be sized smaller than the visual indicator 118 to depict that the number of participants corresponding to Seattle is less than the number of participants corresponding to New York.

In some embodiments, a portion (e.g., a part, or all) of a graphical representation for a sub-group may be displayed. By way of example, each sub-group may be associated with a graphical representation generated in the manner discussed above. The graphical representation for each sub-group could, as a default, be displayed or the graphical representation may appear upon selection of the visual indicator 116. In some embodiments, the graphical representation itself may be used as a visual indicator. A size of the graphical representation may be used to indicate the number of participants within a sub-group. In the example depicted in FIG. 1, for example, the graphical representation 122 corresponding to the sub-group "Seattle" may be presented in a smaller size than the graphical representation 124 corresponding to the sub-group "London" to indicate that the number of participants in the sub-group "Seattle" is less than the number of participants in the sub-group "London." Similarly, the graphical representation 124 corresponding to the sub-group "London" may be presented in a smaller size than the graphical representation 110 corresponding to the sub-group "New York" to indicate that the number of participants in the sub-group "London" is less than the number of participants in the sub-group "New York." In some embodiments, the size of a graphical representation may indicate an input volume corresponding to the sub-group. That is a the larger the size of the graphical representation, the louder the input volume being collectively produced from video feeds of the sub-group.

In some embodiments, sub-group identifiers 126, 128, and 130 may be presented with corresponding visual indicators 116, 118, and 120. In some embodiments, sub-group identifiers 126, 128, and 130 may be presented upon user selection of the visual indicators 116, 118, and 120, respectively. In some embodiments, the size of the sub-group identifier may indicate a size and/or input volume corresponding to the sub-group. That is a the larger the size of the sub-group identifier, the larger the size of the sub-group and/or the larger the input volume being collectively produced from video feeds of the sub-group.

Figure 2:
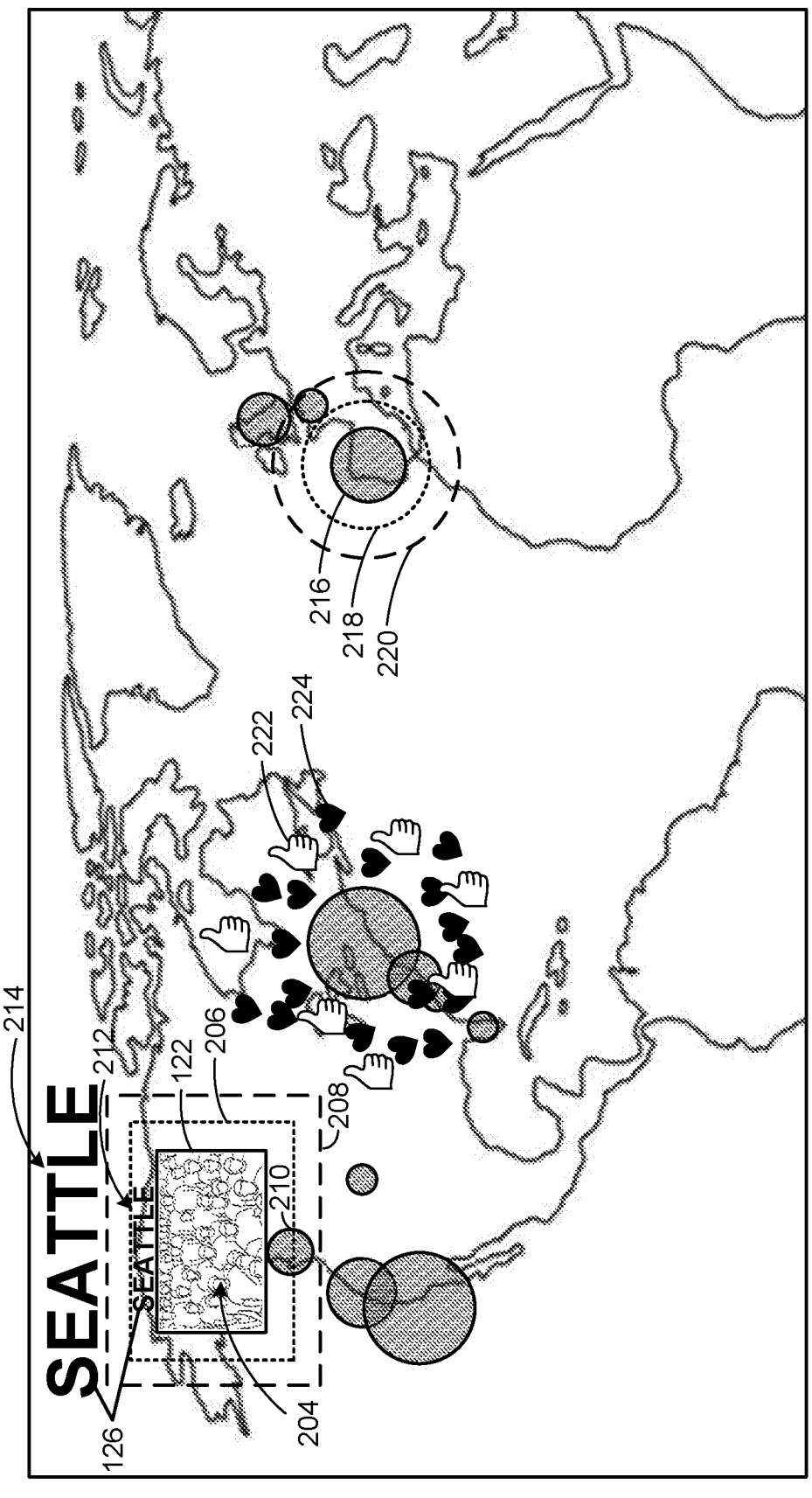
FIG. 2 is a block diagram illustrating an example interface for providing graphical interface elements that indicate sub-group size, participation, and/or input volume, in accordance with at least one embodiment.

FIG. 2 is a block diagram illustrating an example interface 200 including graphical interface elements for indicating sub-group size, participation, and/or input volume, in accordance with at least one embodiment. Interface 200 is intended to depict a portion of the participant window 108 of FIG. 1. As described above in connection with FIG. 1, a graphical representation (e.g., the graphical representation 122) and/or sub-group identifier (e.g., identifier 126) can be utilized to indicate a size and/or input volume corresponding to a particular sub-group. In some embodiments, the graphical representation 122 may be presented in a size corresponding to a first number of participants determined to be within a boundary or within a threshold of a location (e.g., 50 miles, 150 miles, etc.). By way of example, 2,000 participants may be grouped within a Seattle sub-group based at least in part on determining that a location corresponding to each of the participants (e.g., as provided by the participant's computing device or as provided by user input provided by the participant) is within Seattle city limits or, alternatively, is within a predetermined threshold distance (e.g., within 120 miles) of Seattle. In some embodiments, the graphical representation generated for the sub-group may be provided at a size corresponding to that depicted at 204. In some embodiments, this size may be predefined and/or determined based at least in part on the number of participants of the sub-group. Thus, the size may be calculated based at least in part on the number of participants of the sub-group.

If the size of the Seattle sub-group at any suitable time was a larger number, the graphical representation 122 may be presented at a different size corresponding to area 206. If the Seattle sub-group ever included an even larger number of participants, the graphical representation 122 may be presented at yet another different size corresponding to area 208. At any suitable time, the size of the graphical representation 122 may be determined and displayed based at least in part on the number of participants in the Seattle sub-group. Similarly, the identifier 126 may appear in differing sizes based at least in part on the number of participants in the sub-group. By way of example, the identifier 126 may be presented at 212 in one size corresponding one number of participants (e.g., 2,000) while the identifier 126 is presented at 214 in a larger size corresponding to a different number of participants (e.g., 6,000). The font size of the identifier 126 may be a function of the number of participants in the sub-group.

In some embodiments, a visual indicator (e.g., the visual indicator 210, the visual indicator 216, etc.) may be sized according to a number of participants within the sub-group. By way of example, the visual indicator 216 may be depicted at a first size when the number of participants is a first number. The visual indicator 216 may be depicted at a second size at 218 that is larger than the first size when the number of participants is a second number that is greater than the first number. The visual indicator 216 may be depicted at a third size at 220 that is larger than the second size when the number of participants is a third number that is greater than the second number. The size of a visual indicator (e.g., visual indicator 216) may vary over time, getting larger or smaller based at least in part on the number of participants of the sub-group at any given time.

In some embodiments, the number of participants in the sub-group may be monitored. As the number of participants of the sub-group varies, so too may the size of the graphical representation 122 and/or the identifier 126 and/or the visual indicator 210. In this manner, the size of the group may be quickly and visually ascertained.

Although the number of participants in the sub-group may be utilized to identify the size of a graphical element (e.g., the size of the graphical representation 122, the size of the identifier 126, and/or the size of the visual indicator 210), it should be appreciated that input volume corresponding to any suitable portion of audio input may be additionally or alternatively utilized to calculate a size of the graphical element. By way of example, any suitable input (e.g., video and/or audio feeds) provided by respective computing devices of the participants of a sub-group may be obtained and analyzed to determine an volume (e.g., a collective loudness, an average loudness) being exhibited by the participants of the sub-group. In some embodiments, all participant audio input or a predetermined number or percentage of the participants' input may be utilized to determine and actual or estimate of a collective loudness value. In some embodiments, the collective loudness value for the sub-group may be determined by calculating an average loudness exhibited by a portion of the sub-group (e.g., a sample portion that is smaller in number than the total number of participants, all of the participants, etc.). In some embodiments, sounds emitted within each audio input may be ignored for the purpose of this calculation unless the sound breeches a predetermined loudness threshold (e.g., a decibel level). In some embodiments, the collective loudness of the sub-group may be calculated based at least in part on how many audio inputs have been determined to have breached the predetermined loudness threshold recently (e.g., within the last 5 seconds, within the last 10 seconds, within the last 2 seconds, etc.). Thus, in some embodiments, the size of the graphical representation 122, the identifier 126, and/or the visual indicator 216 may be determined and/or modified based at least in part the number of participants and/or the collective loudness value calculated for the sub-group. In this manner, the size of a graphical element (e.g., the graphical representation 122, the identifier 126, and/or the visual indicator 210) may visually indicate of the size and/or collective loudness of the sub-group.

In some embodiments, the participants may utilize an interface (e.g., the interface of FIG. 4, discussed further below) to provide feedback indicating a degree of interest in the streaming content provided at a given time. In some embodiments, this feedback may correspond to graphical elements such as a thumbs up graphical element (e.g., thumbs up graphical element 222, heart graphical element 224). As participants provide this feedback during the live streaming event, corresponding graphical elements may be generated and/or provided at the interactive interface to visually depict this participation. Thus, a performer and/or participant can visually ascertain viewer participation and/or feedback of a particular sub-group. Although thumbs up and/or hearts may be utilized, it should be appreciated that any suitable graphical element of any suitable shape may be utilized to indicate positive or negative feedback such as smiley faces (indicating happy feedback), frowny face (indicating sad feedback), thumbs up (e.g., indicating approval), thumbs down (indicating disapproval), clapping hands (indicating applause/approval), etc.).

Figure 3:
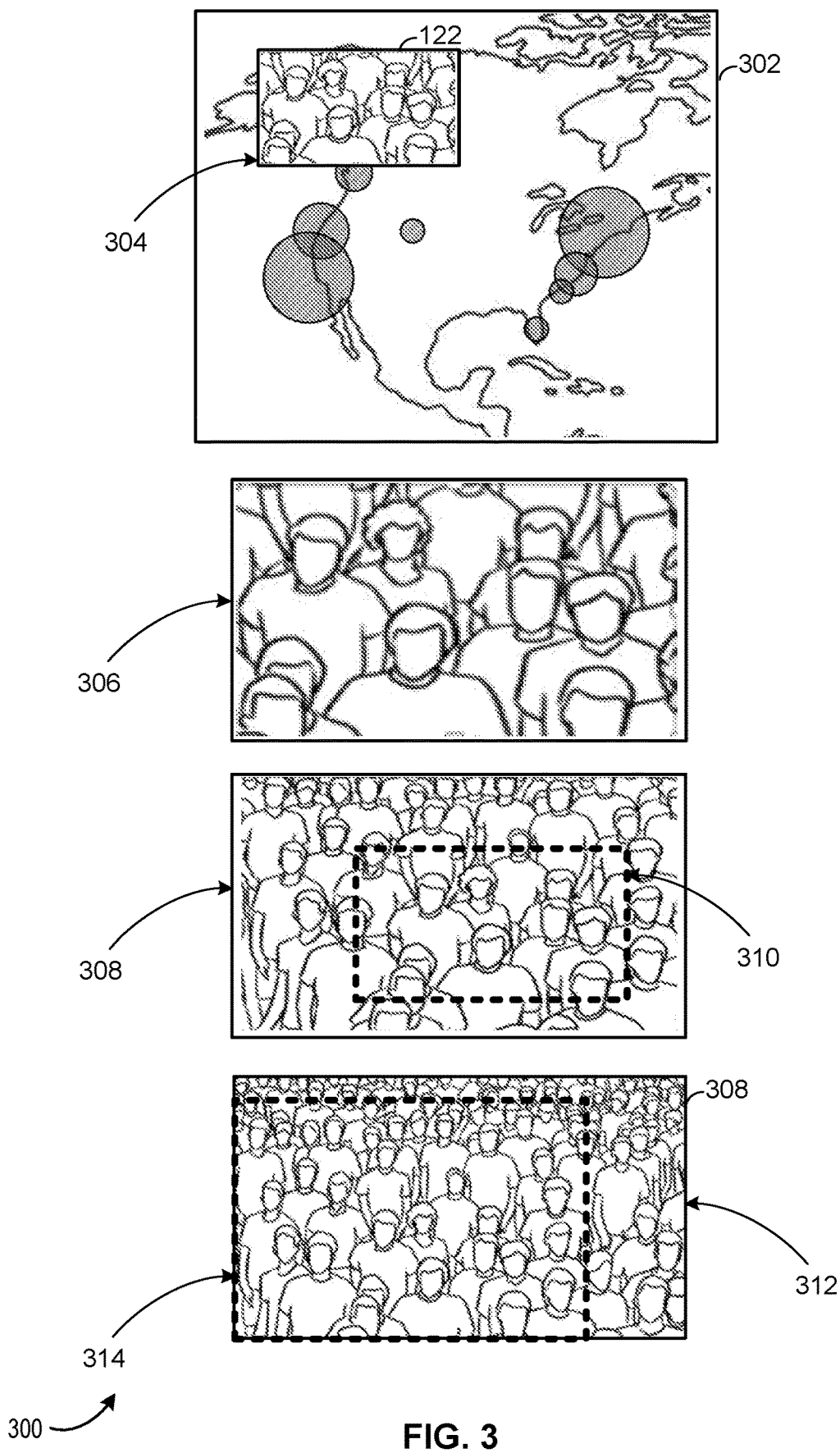
FIG. 3 is a block diagram illustrating a flow illustrating a series of interactions with a graphical representation corresponding to a sub-group, in accordance with at least one embodiment.

Returning now to FIG. 1, as discussed above, the graphical representation for a sub-group (e.g., the graphical representation 110) may incorporate an avatar or an image for each participant in the sub-group. The graphical representation generated and/or provided by default and/or presented in response to user selection of a sub-group may initially display only a portion of the participants. In some embodiments, the user may interact with a graphical representation to zoom in and/or zoom out to display different portions of the graphical representation. FIG. 3 provides an example of such interactions.

FIG. 3 is a block diagram illustrating a flow 300 illustrating a series of interactions with a graphical representation corresponding to a sub-group, in accordance with at least one embodiment. A portion of the participant window 108 of FIG. 1 is provided at 302. As described above, and as depicted in FIG. 3, graphical representation 122 may be presented at 304 at a first size. This size may correspond to a default size or the size may be calculated based at least in part on size and/or input volume of the sub-group as described above. In some embodiments, graphical representation 308 may correspond to an entire portion of the graphical representation generated for this particular sub-group. As depicted in FIG. 3, a smaller portion of the graphical representation 308 may be generated and provided at 304. In some embodiments, the number of people visually depicted in the portion of the graphical interface initially generated and provided at 304 may depend on a total number of participants in a sub-group. Thus, a relatively small sub-group of 50 participants may depict 20 of the participants initially at 304 while a sub-group with 10,000 participants may depict 4,000 participants initially at 304.

In some embodiments, the sub-group may be selected (e.g., based on user input provided by the performer(s), based on identifying the largest sub-group of all the sub-groups, based on identifying a loudest sub-group of all the sub-groups, based on a predetermined sequence of sub-groups, etc.). Upon selection, the size of the graphical representation may be enlarged. By way of example, at 306, the graphical representation 122 may be enlarged to an area that is larger than the area used for displaying the graphical representation 122 at 304. In some embodiments, the graphical representation 122 may be enlarged to occupy the whole of the participant window 108 of FIG. 1 upon selection. When presented at 306, the graphical representation 122 may present the same portion of the graphical representation generated for the sub-group as provided at 304. Although in some examples, the portion of the graphical representation provided at 306 may differ from that provided at 304.

In some embodiments, the user may select an option to zoom out of the graphical representation 122. By way of example, the user may click on, touch, or otherwise select the graphical representation provided at 306 and/or select a menu option (not depicted) for zooming out. In accordance with receiving this user input, the content of the graphical representation 122 may be modified to present a larger view of the graphical representation 308. By way of example, at 308, a larger portion of the graphical representation 308 may be generated and provided. The portion provided at 308 may be larger than the portion 310 corresponding to the portion provided at 306. Thus, without modifying the size of the graphical representation 122, the content of the graphical representation may be altered to show more or less representations of the participants of the sub-group.

While presented at 308, the user may select an option to zoom in to any suitable portion of the graphical representation depicted at 308 (e.g., by selecting any suitable point within the graphical representation provided at 308). The user may also select the option to zoom out once again (not depicted). In accordance with receiving this user input, the content of the graphical representation 122 may be modified once again to present a larger view of the graphical representation 308. By way of example, at 312, a larger portion of the graphical representation 308 (e.g., all of graphical representation 308) may be generated and provided. This larger portion may be larger than the portion 314 corresponding to the portion provided at 308. Thus, without modifying the size of the graphical representation 122, the content of the graphical representation may be altered to show more or less representations of the participants of the sub-group. The user may zoom in and/or out of any suitable portion of the graphical representation 308 to view any of the participants (or avatars representing the participants) of the selected sub-group.

It should be appreciated that while selection of the sub-group and zooming in or out of the graphical representation 122 may be performed via user input and menu selections, in some embodiments selection of the sub-group and/or zooming in and/or out may be performed, at least in part, by the system. By way of example, a performer may visually ascertain from the interactive interface 100 of FIG. 1, that a particular sub-group (e.g., the sub-group corresponding to "New York") is large and/or particular engaged (e.g., based at least in part on seeing the size of the visual indicator, graphical representation, and/or group identifier corresponding to the sub-group). In response the performer may provide audible input that utilized the group identifier (e.g., "Wow! Thanks New York!). The audible input may be converted from speech to text utilizing any suitable speech-to-text algorithm and the text may be parsed to identify any identifier corresponding to any suitable sub-group. If a sub-group identifier is identified from the audible input in this manner, the system may be configured to select the sub-group to enlarge the size of the graphical representation. By way of example, in response to determining the performer used the identifier "New York" in his audible input, the New York sub-group may be selected and its corresponding graphical representation may be enlarged to fit the whole of the participation window 108. The content of the graphical representation may be modified over time to zoom in, pan, and/or zoom out of the graphical representation to show different portions of the graphical representation to the performer. In some embodiments, these modifications may occur in a predetermined manner over a predetermined period of time (e.g., 30 seconds) while the graphical representation is enlarged. In some embodiments, once the predetermined period of time has elapsed, the system may automatically revert to a view of the participant window 108 where the graphical representation of the New York sub-group is no longer visually presented.

In some embodiments, the system may be configured to perform a predefined set of operations corresponding to selecting various sub-groups, zooming in, out, or panning within a graphical representation of a selected sub-group, and reverting to a view of the participation window 108 that does not present the previously selected sub-group's graphical representation. Thus, the performer may be provided various views of the various participants of the streaming event without needing to provide any user input.

As yet another example, the system may be configured to select a sub-group based at least in part on detecting motion and/or identifying a collective loudness of the participants of the sub-group. By way of example video feeds provided by the computing devices of the participants may be provided to the system and analyzed to identify which sub-group is dancing/moving most and/or which sub-group is the loudest. In response to identifying a particular sub-group based on the motion and/or volume of its participants, the system may perform automated operations for zooming in and/or out and/or panning to generate and provide various views/portions of the graphical representation of the sub-group. In some embodiments, the selected group may be selected for a predetermined period of time (e.g., 30 seconds, one minute, etc.) and its graphical representation presented during that time. When that period of time has elapsed, the graphical representation for the sub-group may be minimized and/or closed reverting to a view of the participant window 108 once again until another sub-group is selected (e.g., automatically, by user input, etc.).

Figure 4:
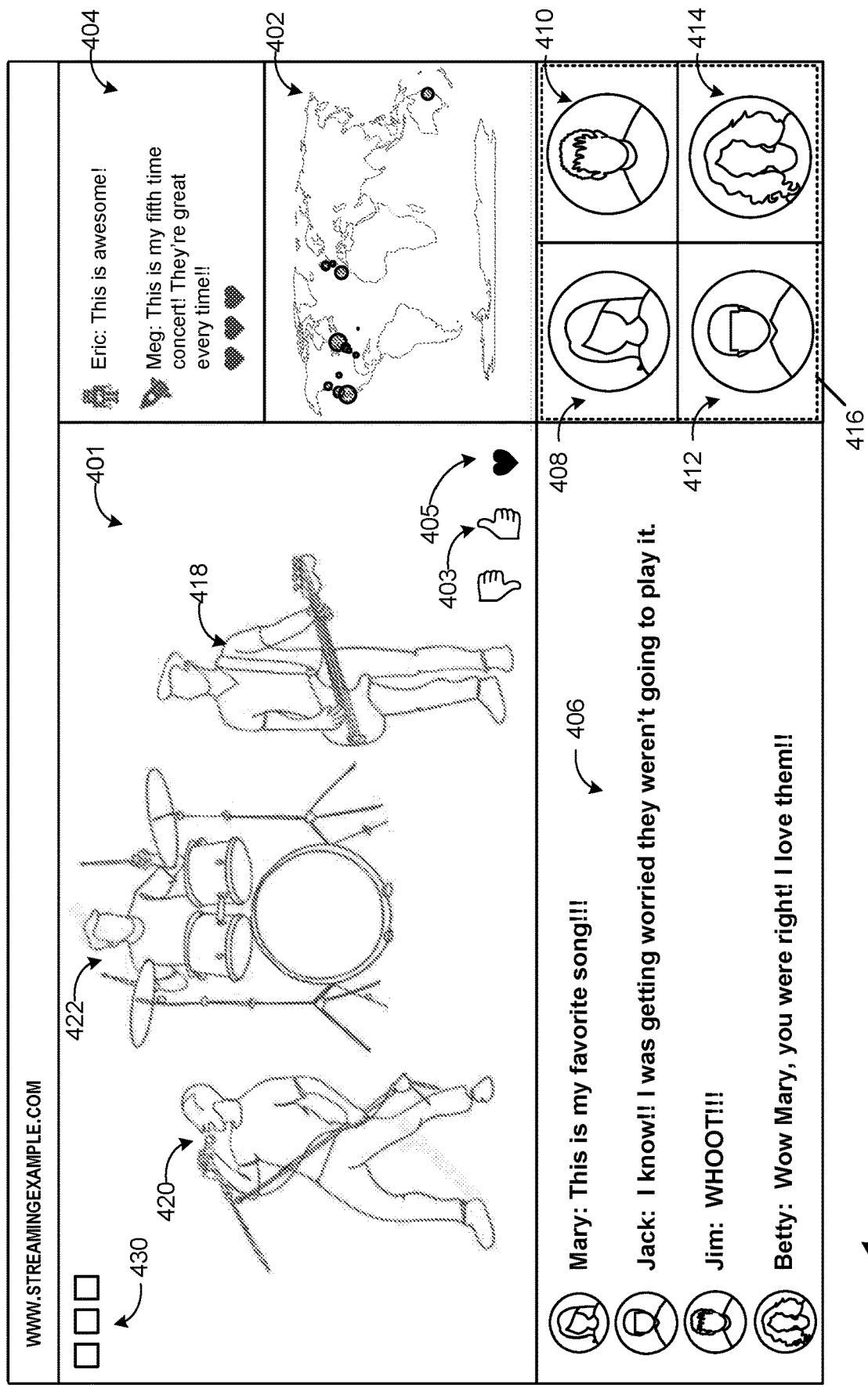
FIG. 4 is a block diagram illustrating an example an interactive interface 400 corresponding to a participant view that presents aspects of a broadcasted live streaming event, in accordance with at least one embodiment.

FIG. 4 is a block diagram illustrating an example an interactive interface 400 corresponding to a participant view that presents aspects of a broadcasted live streaming event, in accordance with at least one embodiment. In some embodiments, the interactive interface 400 may be presented to a participant viewing the broadcasted live streaming event. The participant may be associated by the system with a particular sub-group of participants based at least in part on user input and/or a location identified by the participant's computing device.

The interactive interface 400 may include viewing window 401 that presents the broadcasted live stream of the event. In some embodiments, option 403 and/or option 405 may be provided to enable the participant to provide feedback during the course of the event. By way of example, selecting option 403 may cause a corresponding thumbs up icon to be presented to the performer (e.g., as described in connection with thumbs up graphical element 222 of FIG. 2). Similarly, selecting option 405 may cause a heart icon to be presented to the performed of the event (as described in connection with the heart graphical element 224 of FIG. 2).

In some embodiments, the user (e.g., the participant of the broadcasted live streaming event) may select one or more of the performers 418-422. By selecting one or more of the performers, the user may cause the viewing window 401 to present streaming data of the selected performers. For example, if multiple cameras are utilized which focus, at various times, on each of the performers 418-422, and the video captured by these cameras are streamed in multiple streams, the viewing window 401 may be configured to present streaming data that includes the selected performer(s) over other streams that do not include the selected performer(s). As another example, the user may select one or more of the performer 418-422 in order to cause the viewing window to zoom in on the selected performer(s) and forgo presenting the non-selected performer(s).

In some embodiments, the stream may include video produced by one or more cameras capturing the event from one or more angles. Accordingly, the interactive interface may include user interface elements 430. User interface elements 430 may include any suitable number of elements that may correspond to different cameras and/or angles from which the event has been captured. By selecting any one of the user interface elements 430, the user can switch between cameras, changing the content focus, and/or interact with the event content for a more produced experience. In some embodiments, the user interface elements 430 may include a recording feature that enables the view of the event, as influenced by the user input at user interface elements 430 to be recorded for subsequent playback.

In some embodiments, the interactive interface 400 may include a participant window 402. The participant window 402 may be an example of the participant window 108 of FIG. 1 and may operate in the same manner as described above in connection with FIGS. 1-3. Thus, any suitable sub-group identifiers, graphical representations, and/or visual indicators described above may be generated and provided in the participant window 402. In some embodiments, the user may select to expand the participant window 402 to occupy the whole (or at least a larger portion) of the interactive interface 400.

It should be appreciated that, in some embodiments, the streaming event and the data corresponding to the various sub-groups (e.g., participation numbers, feedback, sound input, etc.) may be recorded in order to provide the capability to playback a previously recorded event. In these examples, it should be appreciated that the participant window 402 may also be provided when the interactive interface 400 is utilized for playback rather than the viewing of a live streaming event. Thus, the user, even during playback, may interact with the interface to view various aspects of the sub-groups of participants (e.g., to ascertain size and/or loudness of a sub-group, to zoom in, out, and/or pan within respective graphical representations of the sub-groups, etc.).

The interactive interface 400 may include one or more chat windows. By way of example, the chat window 404 may include chat input provided by any suitable participant of the streaming event or, in some embodiments, the chat window 404 may include chat input provided by any suitable participant of the sub-group to which this particular participant has been associated. In some embodiments, the participant may be provided options (not depicted) to specify a number of friends who are also viewing the streaming event. Once specified, the chat window 406 may be presented and utilized to display the chat input provided by the friends specified by the participant. In some embodiments, the participants selected for chat window 406 may be identified based at least in part on obtaining a list of the participant's friends from a social media website. Once the list is obtained, the system may automatically identify the participant's friends and add them to a chat corresponding to the chat window 406. In some embodiments, the participants of the chat corresponding to chat window 406 need not be associated with the same sub-group. The chat input of chat window 404 and/or chat window 406 may be recorded and provided later during a playback of the streaming event.

In some embodiments, video feeds, images, and/or avatars corresponding to the chat participants of chat window 406 may be presented. By way of example, an image, video feed, and/or avatar of the participant may be provided at 408, while respective images, video feeds, and/or avatars of her friends may be provided at 410, 412, and 414. In some embodiments, the area 416 may be utilized to present one video feed/image/avatar. For example, the participant's video feed/image/avatar may be presented in area 416 only. In some embodiments, the area in which the participant's video feed/image/avatar is being presented may be highlighted, flash, or provide any suitable indicator when the participant's image and/or video feed is being presented via feature window 104 of FIG. 1.

In some embodiments, the chat window 406 is not presented. By way of example, in some embodiments, the participant and her friends (e.g., friends specified by the participant or participants identified as friends of the participant via social media website data, referred to as a "communication group") may communicate using respective video and/or audio feeds. An image or video feed of the current speaker of the communication group may be presented via the area 416. In some embodiments, each image and/or video feed of each participant of the communication group may be presented at all times and highlighted or otherwise flagged to indicate when the participant is talking. As a non-limiting example, the image and/or video feed may be bordered with a thick colored border to indicate a corresponding participant is speaking.

Figure 5:
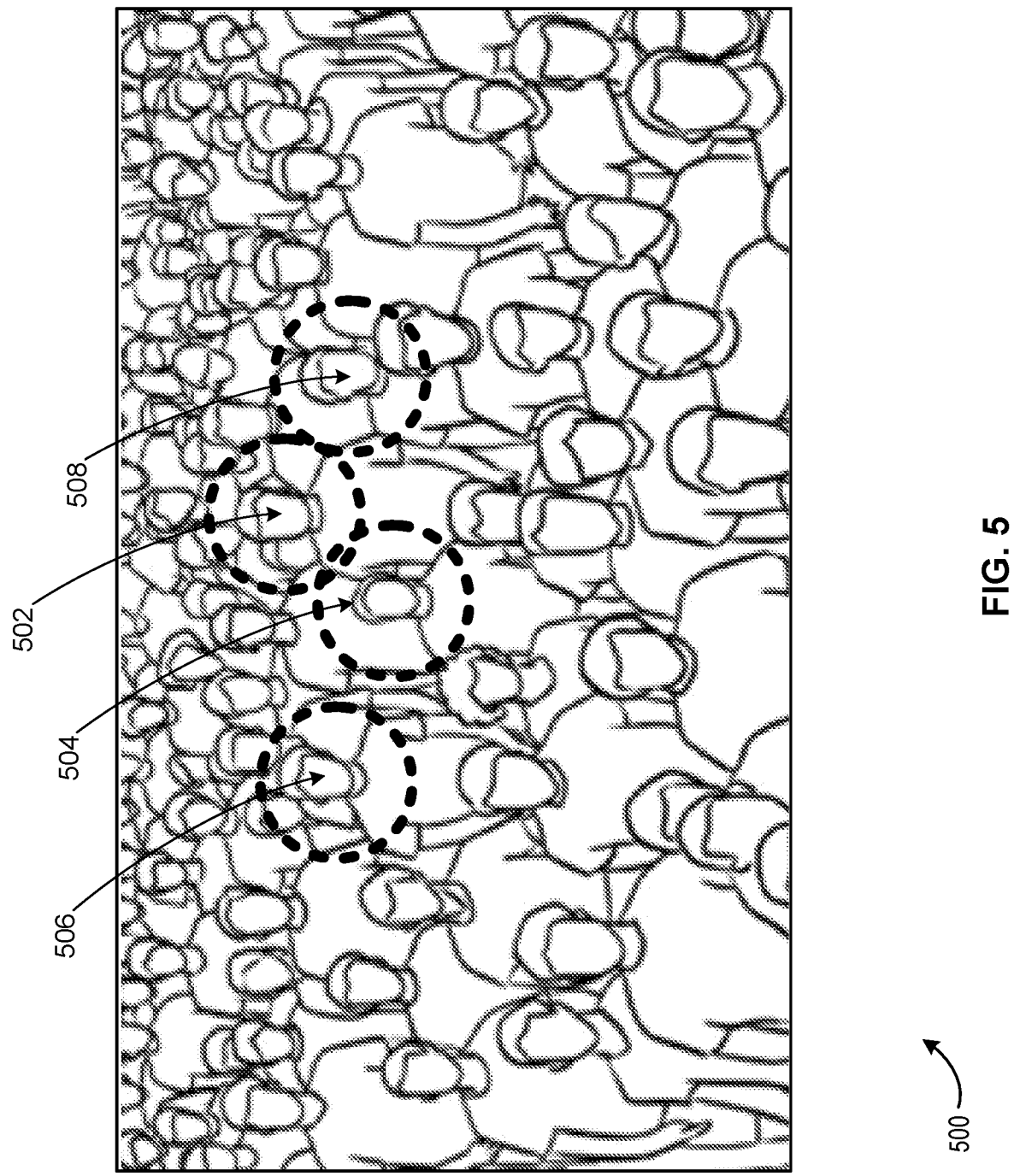
FIG. 5 is a block diagram illustrating an example graphical representation of a sub-group of event participants, in accordance with at least one embodiment.

In some embodiments, the area 416 may include a graphical representation of the participant's sub-group which may be altered to include images and/or video feeds corresponding to the participant's friends. FIG. 5 provides such an example.

FIG. 5 is a block diagram illustrating an example graphical representation 500 corresponding to a sub-group of event participants, in accordance with at least one embodiment. In some embodiments, as described above, the graphical representation 500 for a sub-group (e.g., the Seattle sub-group of FIG. 1) may include images, video feeds, and/or avatars corresponding to each of the participants of the sub-group. In some embodiments, when a participant designates one or more participants for the communication group discussed above in connection with FIG. 4, and/or one or more participants of the event are identified as being friends with the participant with respect to a social media platform, the graphical representation 500 may be modified to depict the participant as being collocated with his or her friends.

By way of example, regardless of sub-group association, each of the participants of the communication group of FIG. 4 may be depicted in the graphical representation for the participant's sub-group. In some embodiments, an image, video feed, or avatar corresponding to each participant of the communication group may be obtained and inserted within the graphical representation 500 as depicted in FIG. 5.

By way of example, at 502, FIG. 5 may depict an image/video feed/avatar corresponding to the participant. At 504, an image/video feed/avatar corresponding to the participant depicted at 410 of FIG. 4 may be presented. At 506, an image/video feed/avatar corresponding to the participant depicted at 412 of FIG. 4 may be presented. At 508, an image/video feed/avatar corresponding to the participant depicted at 414 of FIG. 4 may be presented. Thus, area 416 of FIG. 4 may present the graphical representation 500 of FIG. 5 to visually depict the participant being collocated with his or her friends as if the participants of the communication group had attended the event in the same physical space (e.g., at a stadium). If an avatar is used to depict a participant, the avatar may be animated based at least in part on motions made by that participant that are detected via a video feed provided by that participant's computing device.

Figure 6:
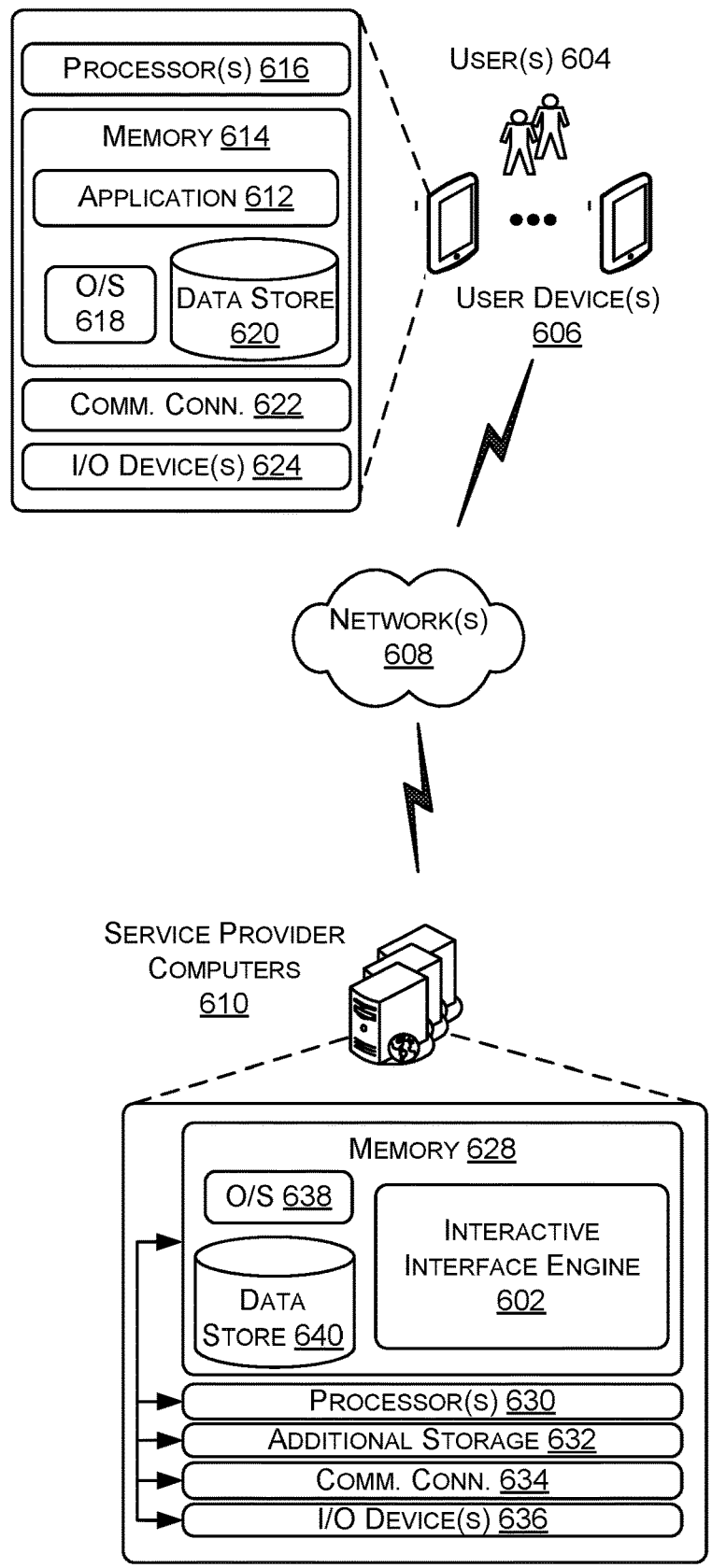
FIG. 6 is a block diagram illustrating example components of a live streaming system, in accordance with at least one embodiment.

FIG. 6 is a block diagram illustrating example components of a live streaming system (e.g., system 600), in accordance with at least one embodiment. The system 600 may include an interactive interface engine 602 configured to provide the interactive interfaces and/or interactive interface elements discussed above in connection with FIGS. 1-5. In system 600, one or more user(s) 604 may utilize a user device (e.g., a user device of a collection of user device(s) 606) to provide input via network(s) 608 to the service provider computer(s) 610. For example, the user may access any suitable input/output devices (e.g., I/O devices 624 discussed below) such as a keyboard, a microphone, and the like, to provide input (e.g., via an application 612 running on the user device(s) 606) to service provider computer(s) 610 via one or more network(s) 608. In some aspects, the application 612 (e.g., a web browser application, a streaming application) operating on the user device(s) 606 may be hosted, managed, and/or provided by a computing service or service provider, such as by utilizing one or more service provider computer(s) 610.

In some examples, the network(s) 608 may include any one or a combination of many different types of networks, such as cable networks, the Internet, wireless networks, cellular networks, and other private and/or public networks. While the illustrated example represents the user(s) 604 accessing application functionality over the network(s) 608, the described techniques may equally apply in instances where the user(s) 604 interact with the service provider computer(s) 610 via the one or more user device(s) 606 over a landline phone, via a kiosk, or in any other suitable manner. It should be appreciated that the described techniques may apply in other client/server arrangements, as well as in non-client/server arrangements (e.g., locally stored applications, etc.). Additionally, in some embodiments, the interactive interface engine 602, discussed further below in more detail, may operate in whole or in part on the user device(s) 606. Thus, in some embodiments, the user(s) 604 may access the functionality of the interactive interface engine 602 directly through the user device(s) 606 and/or the service provider computer(s) 610 via user interfaces provided by the interactive interface engine 602. In some embodiments, the functionality of the interactive interface engine 602 may be provided as a software service with which user input may be submitted and various interfaces and/or interface elements may be presented via the application 612 at the user device(s) 606.

In some embodiments, the application 612 may allow the user(s) 604 to interact with the service provider computer(s) 610 so as to provide the various functionality described above with respect to the interactive interface engine 602. For example, the application 612 may provide contextual data to the service provider computer(s) 610. The application 612 may be configured to transmit (electronically convey) user input to the interactive interface engine 602, operating at the user device(s) 606 and/or the service provider computer(s) 610. The application 612 may further be configured to receive, process, and/or present (via a display and/or speaker of the user device(s) 606 or another suitable output device) any suitable data received from the service provider computer(s) 610 (e.g., live streaming content, interactive interfaces, interactive interface elements and/or content, etc.).

The service provider computer(s) 610, perhaps arranged in a cluster of servers or as a server farm, may host the application 612 operating on the user device(s) 606 and/or cloud-based software services. Other server architectures may also be used to host the application 612 and/or cloud-based software services. The application 612 operating on the user device(s) 606 may be capable of handling requests from the user(s) 604 and serving, in response, various user interfaces and/or output that can be presented at the user device(s) 606 (e.g., via a display and/or speaker). The application 612 operating on the user device(s) 606 can present any suitable type of website that supports user interaction, including search engine sites, a website provided by a live streaming platform, and the like. The described techniques can similarly be implemented outside of the application 612, such as with other applications running on the user device(s) 606.

The user device(s) 606 may be any suitable type of computing device such as, but not limited to, a mobile phone, a smart speaker, a hand-held scanner, a touch screen device, a smartphone, a personal digital assistant (PDA), a laptop computer, a desktop computer, a thin-client device, a tablet PC, an electronic book (e-book) reader, etc. In some examples, the user device(s) 606 may be in communication with the service provider computer(s) 610 via the network(s) 608, or via other network connections.

In one illustrative configuration, the user device(s) 606 may include at least one memory 614 and one or more processing units (or processor(s)) 616. The processor(s) 616 may be implemented as appropriate in hardware, computer-executable instructions, firmware, or combinations thereof. Computer-executable instruction or firmware implementations of the processor(s) 616 may include computer-executable or machine-executable instructions written in any suitable programming language to perform the various functions described.

The memory 614 may store program instructions that are loadable and executable on the processor(s) 616, as well as data generated during the execution of these programs. Depending on the configuration and type of user computing device, the memory 614 may be volatile (such as random access memory (RAM)) and/or non-volatile (such as read-only memory (ROM), flash memory, etc.). The user device(s) 606 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 614 may include multiple different types of memory, such as static random access memory (SRAM), dynamic random access memory (DRAM), or ROM.

Turning to the contents of the memory 614 in more detail, the memory 614 may include an operating system 618, one or more data stores 620, and one or more application programs, modules, or services for implementing the features of the interactive interface engine 602 disclosed herein, provided via the application 612 (e.g., a browser application, a shopping application, a digital assistant application, etc.). The application 612 may be configured to receive, store, and/or display a network page or other interface for interacting with the service provider computer(s) 610. In some embodiments, the application 612 may be configured to present user options and/or receive user input audibly. In some embodiments, the memory 614 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user device(s) 606 may also contain communications connection(s) 622 that allow the user device(s) 606 to communicate with a stored database, another computing device or server (e.g., the service provider computer(s) 610), user terminals and/or other devices on the network(s) 608. The user device(s) 606 may also include I/O device(s) 624, such as a keyboard, a mouse, a pen, a voice input device (e.g., a microphone), a touch input device, a display, speakers, a printer, etc.

In some aspects, the service provider computer(s) 610 may also be any suitable type of computing devices such as, but not limited to, a mobile phone, a smart speaker, smart phone, a personal digital assistant (PDA), a laptop computer, a desktop computer, a server computer, a thin-client device, a tablet PC, etc. Additionally, it should be noted that in some embodiments, the service provider computer(s) 610 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 610 may be in communication with the user device(s) 606 and/or other service providers via the network(s) 608 or via other network connections. The service provider computer(s) 610 may include one or more servers, perhaps arranged in a cluster, as a server farm, or as individual servers not associated with one another.

These servers may be configured to implement the functionality described herein as part of an integrated, distributed computing environment.

In one illustrative configuration, the service provider computer(s) 610 may include at least one memory 628 and one or more processing units (or processor(s)) 630. The processor(s) 630 may be implemented as appropriate in hardware, computer-executable instructions, firmware, or combinations thereof. Computer-executable instruction or firmware implementations of the processor(s) 630 may include computer-executable or machine-executable instructions written in any suitable programming language to perform the various functions described.

The memory 628 may store program instructions that are loadable and executable on the processor(s) 630, as well as data generated during the execution of these programs. Depending on the configuration and type of service provider computer(s) 610, the memory 628 may be volatile (such as RAM) and/or non-volatile (such as ROM, flash memory, etc.). The service provider computer(s) 610 or servers may also include additional storage 632, which may include removable storage and/or non-removable storage. The additional storage 632 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 628 may include multiple different types of memory, such as SRAM, DRAM, or ROM.

The memory 628, the additional storage 632, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 628 and the additional storage 632 are all examples of computer storage media. Additional types of computer storage media that may be present in the service provider computer(s) 610 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 610. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 610 may also contain communications connection(s) 634 that allow the service provider computer(s) 610 to communicate with a stored database, another computing device or server, user terminals and/or other devices on the network(s) 608. The service provider computer(s) 610 may also include I/O device(s) 636, such as a keyboard, a mouse, a pen, a voice input device, a touch input device, a display, speakers, a printer, etc.

Turning to the contents of the memory 628 in more detail, the memory 628 may include an operating system 638, one or more data stores 640, and/or one or more application programs, modules, or services for implementing the features disclosed herein, such as the features provided by the interactive interface engine 602.

Figure 7:
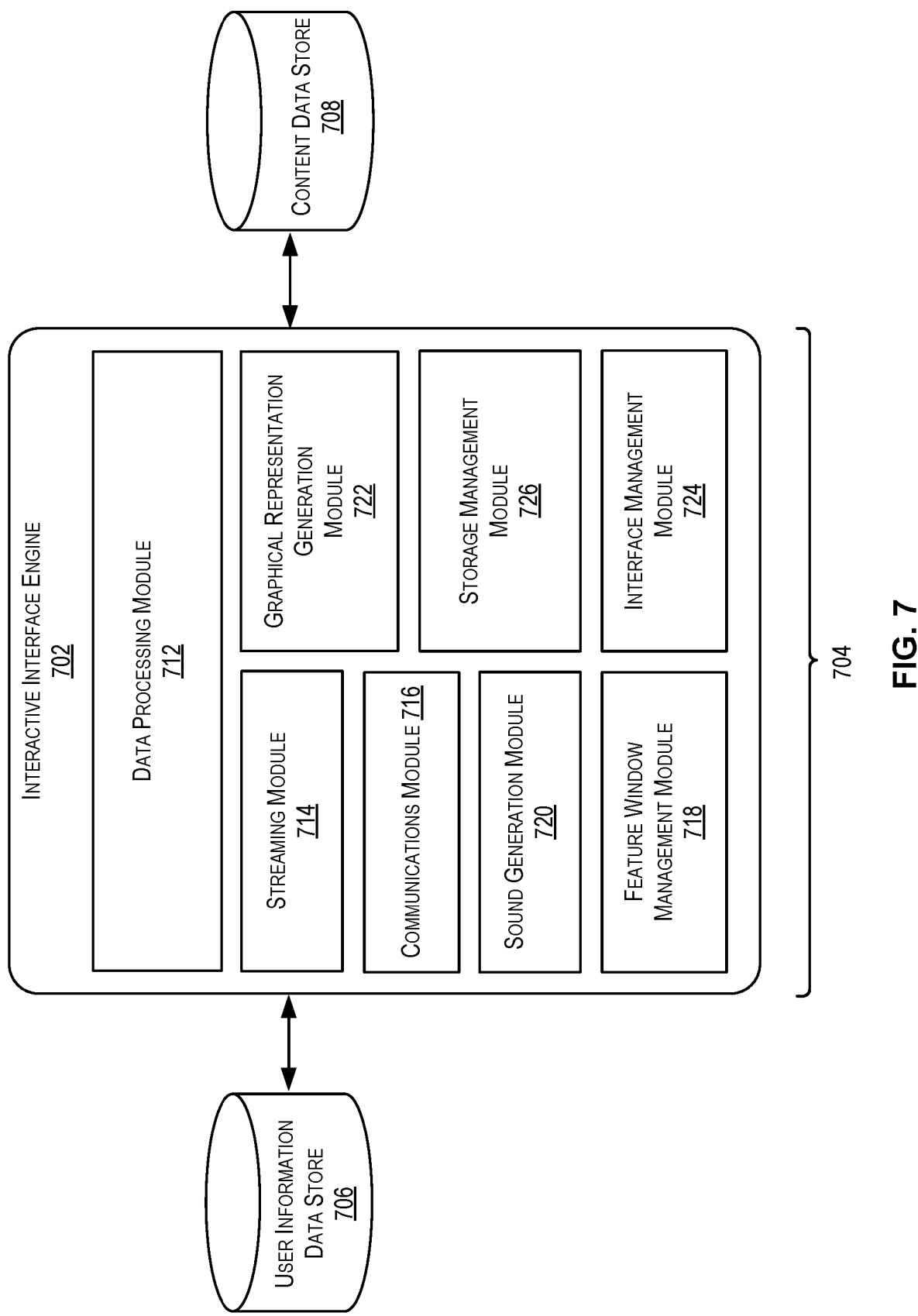
FIG. 7 is a schematic diagram illustrating an example computer architecture for an interactive interface engine, including a plurality of modules that may perform functions in accordance with at least one embodiment.

FIG. 7 is a schematic diagram illustrating an example computer architecture 700 for interactive interface engine 702 (e.g., an example of the interactive interface engine 602 of FIG. 6), including a plurality of modules 704 that may perform functions in accordance with at least one embodiment. The modules 704 may be software modules, hardware modules, or a combination thereof. If the modules 704 are software modules, the modules 704 can be embodied on a computer readable medium and processed by a processor in any of the computer systems described herein. It should be noted that any module or data store described herein, may be, in some embodiments, be a service responsible for managing data of the type required to make corresponding calculations. The modules 704, or some portion of the modules 704, may be operate at the service provider computer(s) 610 of FIG. 6, or the modules may operate as separate modules or services external to the service provider computer(s) 610 (e.g., as part of the application 612 of FIG. 6 operating on the user device(s) 606 of FIG. 6).

In the embodiment shown in the FIG. 7, data stores 706 and 708 are shown, although data can be maintained, derived, or otherwise accessed from various data stores, either remote or local to the interactive interface engine 702, to achieve the functions described herein. In at least one embodiment, the data stores 706 and/or 708 described herein may be physically located on the user device(s) 606 or alternatively, any suitable combination of the data stores may be operated as part of the service provider computer(s) 610, for example, as part of the interactive interface engine 702. The interactive interface engine 702, as shown in FIG. 7, includes various modules such as a data processing module 712, a streaming module 714, a communication module 716, a feature window management module 718, a sound generation module 720, a graphical representation generation module 722, a storage management module 724, and an output module 726. Some functions of the modules 704 are described below. However, for the benefit of the reader, a brief, non-limiting description of each of the modules is provided in the following paragraphs.

In at least one embodiment, the interactive interface engine 702 includes the data processing module 712. Generally, the data processing module 712 may be utilized to receive or transmit any suitable information with respect to any example provided herein. By way of example, if the data processing module 712 operates at the service provider computer(s) 610 of FIG. 6, the data processing module 712 may receive a selection of a particular live streaming event and provide such data to the streaming module 714 to cause the streaming module 714 (also operating at the service provider computer(s) 610) to stream the live event to one or more user devices. If the data processing module 712 operates at a user device (e.g., the user device(s) 606 of FIG. 6), the data processing module 712 may be configured to receive packets corresponding to the stream of the live event and provide these packets to the streaming module 714 (e.g., operating as part of the application 612 of FIG. 6) which can assemble the packets and play them at the user device (e.g., via one or more viewing windows such as viewing window 102 of FIG. 1 and/or viewing window 401 of FIG. 4).

In some embodiments, the data processing module 712 may obtain user profile data that has been previously stored in the user information data store 706. In some embodiments, the user profile data was obtained based at least in part on a registration process performed prior to selection of a live streaming event. The user profiled data may include a name, address, age, location, one or more computing device identifiers corresponding to computing devices of the user, and/or any suitable attribute of the user. In some embodiments, the data processing module 712 may receive location data from one or more computing devices and may store such data in the user information data store 706. The data processing module 712 may include any suitable number of application programming interfaces with which the functionality of the interactive interface engine 702 may be invoked. In some embodiments, the data processing module 712 may be configured to invoke the functionality provided by any of the modules 714-726.

In some embodiments, the data processing module 712 may be configured to obtain video and/or audio feeds from one or more participants of a live event. The data processing module 712 may store this video/audio data within the content data store 708 for subsequent use and/or the data processing module 712 may provide this video/audio data to any suitable number of the other modules of interactive interface engine 702. In general, any suitable data may be received by the data processing module 712 and passed to the other modules of the interactive interface engine 712. Likewise, any suitable data may be provided by the modules of the interactive interface engine 712 any transmitted by the data processing module 712 to one or more other computing devices.

The communications module 716 may be configured with code that, when executed, performs any suitable operations related to managing one or more chat windows (e.g., chat window 106 of FIG. 1 and/or chat windows 404 and/or 406 of FIG. 4). Thus, chat input can be received by the communications module 716 (e.g., via the data processing module 712) and presented via one or more interactive interfaces provided by the interactive interface engine 702.

The feature window management module 718 may be configured with code that, when executed, performs any suitable operations related to selecting and displaying images and/or video feeds at a feature window of an interactive interface provided by the interactive interface engine 702. By way of example, the feature window management module 718 may be configured to select images and/or video feeds of one or more participants to be featured within feature window 104 of FIG. 1. Any suitable operations discussed above in connection with the feature window 104 may be provided by the feature window management module 718. The feature window management module 718 may be configured to make these selections based at least in part on any suitable predefined criteria including, but not limited to, a designation, membership, or classification of the participant, a fee previously paid by the participant, an amount of motion and/or loudness of the participant as identified from a video and/or audio feed associated with the participant, etc.

The sound generation module 720 may be configured with code that, when executed, performs any suitable operations related to generating collective sound data. In some embodiments, the sound generation module 720 may obtain (e.g., via the data processing module 712) two or more audio inputs (e.g., audio feeds, video feeds with audio components, etc.) corresponding to two or more participants. In some embodiments, the sound generation module 720 may be configured with code that identifies whether the audio inputs breach a predefined threshold (e.g., a loudness threshold) and/or that the audio inputs include a particular type of sound (e.g., clapping, cheering, booing, etc.). Based at least in part on one or both of these identifications, the audio input may be combined according to a predefined scheme. In some embodiments, the sound generation module 720 may be configured with code that obtains previously provided sound files corresponding to clapping, cheering, booing, applause, etc. and may identify a predetermine sound file as being of a same type of sound as a sound identified within audio input(s) associated with one or more participants. The predetermined sound file may be played and/or combined with other predetermined sound files to generate a collective sound file that mimics the sound collectively provided by two or more audio inputs corresponding to two or more participants (e.g., participants of a sub-group). Thus, in some embodiments, one or more participants' actual audio input may be utilized to generate a collective sound for the sub-group and/or one or more predetermined sound files may be used to generate a collective sound for the sub-group.

The graphical representation generation module 720 may be configured with code that, when executed, performs any suitable operations related to grouping participants in sub-groups based at least in part on location and generating any suitable graphical representation for each sub-group as discussed above in connection to FIGS. 1-5. The code of the graphical generation module 720, when executed, causes locations for each of the participants to be identified (e.g., based on previously received user input of the participants, based on location data provided by the computing devices of the participants, etc.). The participants' locations may be compared to previously specified locations (e.g., locations corresponding to cities, towns, counties, countries, building, etc.) and if a participant's location is determined to be within a threshold distance of the previously specified location, the participant may be associated with a sub-group corresponding to the previously specified location. In some embodiments, the participants' locations may be compared to previously specified areas (e.g., areas defined by one or more boundaries) and if a participant's location is determined to be within the area, the participant may be associated with a sub-group that is associated with the area (e.g., an area corresponding to a city, town, building, county, state, country, etc.). In some embodiments, the representation generation module 720 may be configured with code that, when executed, performs any suitable operations related to generating graphical representations for each sub-group of participants. By way of example, images and/or video feeds of the participants of the sub-group may be obtained. Any suitable combination of the images, video feeds, and/or avatars (e.g., predetermined avatars, user-defined avatars, etc.) may be utilized to generate a graphical representation of the sub-group that depicts stationary and/or animated representations of the participants of a sub-group as if the participants were physically collocated (e.g., within a stadium, in a crowd, etc.). Various techniques for utilizing images, video feeds, and/or avatars to generate these graphical representations (e.g., graphical representation 110 of FIG. 1) is discussed above in connection with FIG. 1.

The interface management module 724 may be configured with code that, when executed, performs any suitable operations related to receiving data from and/or providing the interactive interfaces/interface elements of FIGS. 1-5. By way of example, the code of the interface management module 724 may include any suitable operations for generating and/or modifying the presentation of one or more map(s), graphical representations, visual indicators, sub-group identifiers, graphical elements (e.g., thumbs up, hearts, etc.) utilized as feedback to the live event, or any suitable data provided via a participant window as discussed above in connection with FIGS. 1-5. In some embodiments, the icons/video feeds of the participant and/or the participant's friends and/or other chat participants may be provided (e.g., by the interface management module 724) at the interactive interface as depicted at 408-414 of FIG. 4. In some embodiments, the participant's image and/or feed may be highlighted and/or some indicator may be provided to indicate when the participant's image and/or feed is being featured within the feature window at an interactive interface utilized by the performer(s).

The storage management module 726 may be configured with code that, when executed, performs any suitable operations related to recording and/or storing video feeds of the participants, chat input of the participants corresponding to one or more chats, graphical representations generated and corresponding to particular times within the live streaming vent. Any suitable data corresponding to any of the interactive interfaces discussed above in connection with FIGS. 1-5 may be stored (e.g., in the content data store 708) for later playback. In some embodiments, the storage management module 726 may be configured to receive user input (e.g., via the data processing module) and playback the live streaming event in response to the user input. In some embodiments, the storage management module 726 may cause any suitable operation to be executed to display any graphical representation, visual indicator, sub-group identifier, chat input, icons, feedback, and/or any suitable interface element described above in connection with FIGS. 1-5 to be presented in the same manner and at the same time within the playback of the event as when these interface elements were presented when the event was being broadcasted live.

Figure 8:
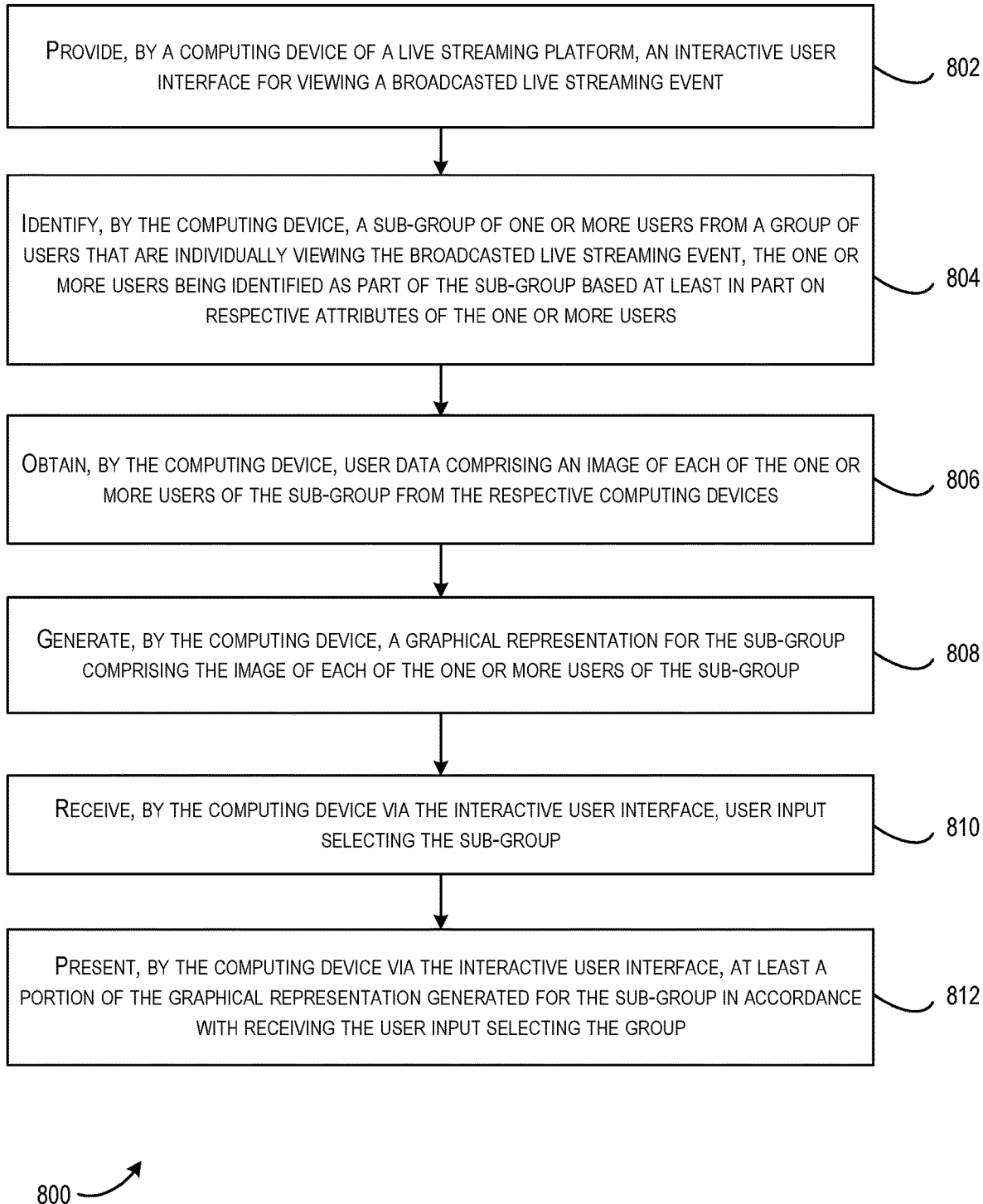
FIG. 8 is a flow diagram illustrating an example method for utilizing an interactive interface provided by the interactive interface engine 702 of FIG. 7, in accordance with at least one embodiment.

FIG. 8 is a flow diagram illustrating an example method 800 for utilizing an interactive interface provided by the interactive interface engine 702 of FIG. 7, in accordance with at least one embodiment. A computer-readable medium may store computer-executable instructions that, when executed by at least one processor, cause at least one computer to perform instructions comprising the operations of the method 800. It should be appreciated that the operations of the method 800 may be performed in any suitable, not necessarily the order depicted in FIG. 8. Further, the method 800 may include additional, or fewer operations than those depicted in FIG. 8. The operations of method 800 may be performed by a computing system (e.g., the system 600) comprising the interactive interface engine 702 of FIG. 7 which may operate in whole or in part on a user device (e.g., one or more of the user device(s) 606 of FIG. 6) and/or the service provider computer(s) 610 of FIG. 6.

The method 800 may begin at block 802, where an interactive user interface for viewing a broadcasted live streaming event may be provided by a computing device of a live streaming platform (e.g., by the service provider computer(s) 610 of FIG. 6 and rendered at the user device(s) 606 of FIG. 6). The interactive user interface may be an example of the interactive interfaces 100 and/or 400 of FIGS. 1 and 4, respectively.

At 804, a sub-group of one or more users (e.g., participants) from a group of users (e.g., participants) that are individually viewing the broadcasted live streaming event may be identified by the computing device (e.g., by the data processing module 712 of FIG. 7). By way of example, the one or more users may be identified as part of the sub-group based at least in part on respective attributes of the one or more users. The respective locations may be determined based at least in part on user profile data previously stored and associated with the user and/or at the respective locations may be determined based at least in part on location data (e.g., GPS data) provided by the respective computing devices. The respective locations corresponding to the one or more users may be utilized to group users that are within a threshold distance of a predefined location (e.g., a location corresponding to a city, a county, a town, a building, etc.) or that are determined to be within a predefined boundary (e.g., a boundary defining a city, county, town, country, state, region, etc.).

At 806, user data comprising an image of each of the one or more users of the sub-group may be obtained. In some embodiments, the image may be obtained from the respective computing devices. By way of example, the image may be a video frame of a video feed captured by a camera of the respective computing device. In some embodiments, the image may be stored within the user information data store 706 as part of the participant's user profile data. In some embodiments, the image may include an avatar corresponding to the user. The avatar may be system and/or user generated.

At 808, the image obtained at 806 may be utilized by the computing device to generate (e.g., by the graphical representation generation module 722 of FIG. 7) a graphical representation for the sub-group. In some embodiments, the graphical representation (e.g., the graphical representation 110 of FIG. 1) may comprise the image of each of the one or more users of the sub-group. Various manners of generating the graphical representation are discussed above in connection with FIGS. 1, 5, and 7.

At 810, user input selecting the sub-group may be received by the computing device via the interactive user interface (e.g., the interactive interface 100 of FIG. 1).

At 812, at least a portion of the graphical representation generated for the sub-group may be presented by the computing device via the interactive user interface, in accordance with receiving the user input selecting the group.

Figure 9:
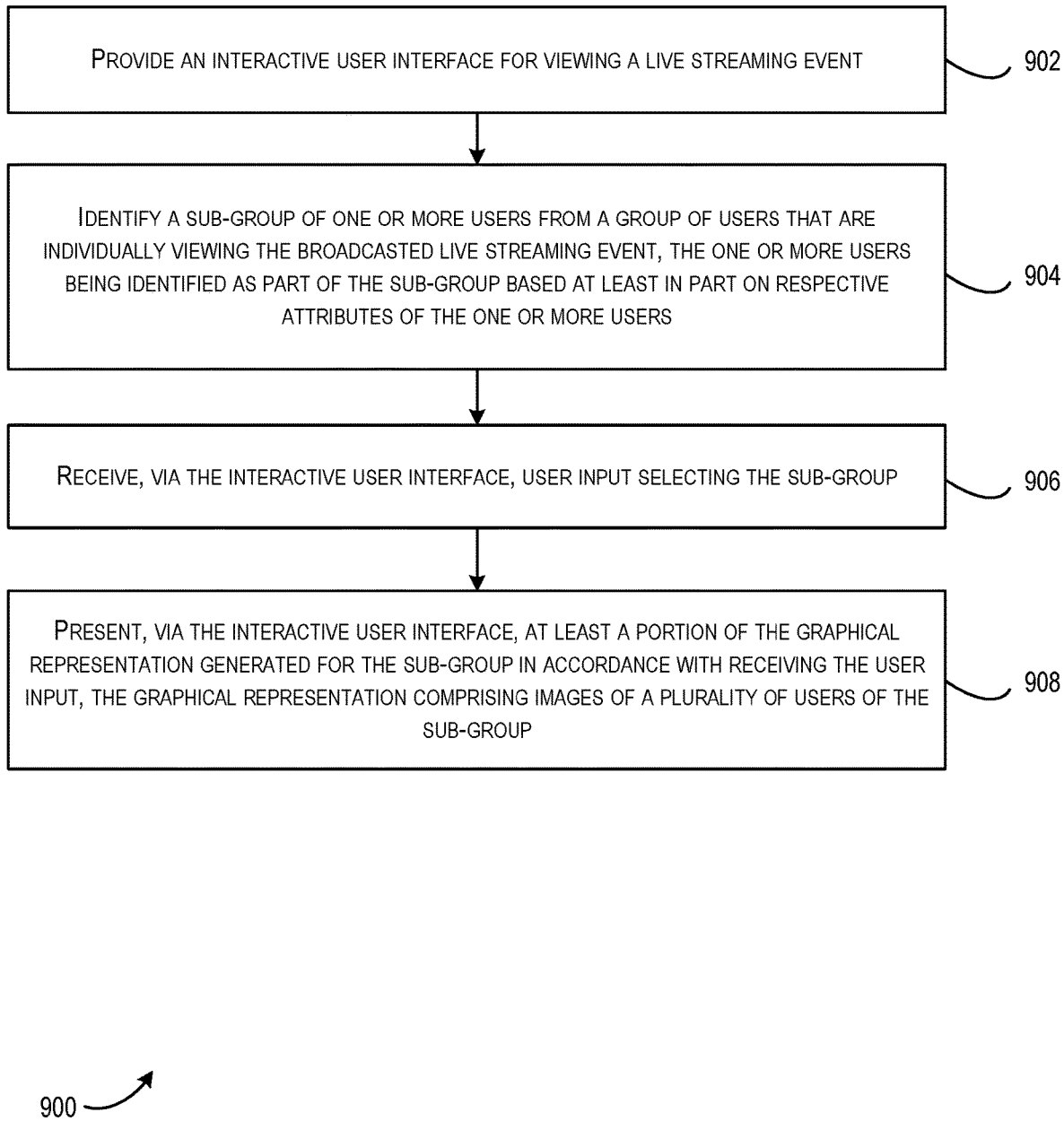
FIG. 9 is a flow diagram illustrating another example method for utilizing an interactive interface provided by the interactive interface engine 702 of FIG. 7, in accordance with at least one embodiment.

FIG. 9 is a flow diagram illustrating another example method for utilizing an interactive interface provided by the interactive interface engine 702 of FIG. 7, in accordance with at least one embodiment. The method 900 may be performed by a computing device of a live streaming platform (e.g., the service provider computer(s) 610 of FIG. 6. In some embodiments the computing device may include one or more processors and a memory storing executable instructions that, upon execution by the one or more processors, cause the computing device to perform the method 900.

The method may begin at 902, where an interactive user interface for viewing a live streaming event (e.g., interactive interface 100 or interactive interface 400 of FIGS. 1 and 4) may be provided (e.g., by the interactive interface engine 702 of FIG. 7).

At 904, a sub-group of one or more users from a group of users that are individually viewing the broadcasted live streaming event may be identified (e.g., by the data processing module 712 of FIG. 7). In some embodiments, the one or more users may be identified as part of the sub-group based at least in part on respective attributes of the one or more users.

At 906, user input selecting the sub-group may be received via the interactive user interface.

At 908, at least a portion of the graphical representation generated for the sub-group (e.g., by the graphical representation generation module 722) may be presented (e.g., via the output module 726 of FIG. 7) via the interactive user interface and in accordance with receiving the user input. In some embodiments, the graphical representation (e.g., the graphical representation 308 of FIG. 3) may comprise images of a plurality of users of the sub-group.

Figure 10:
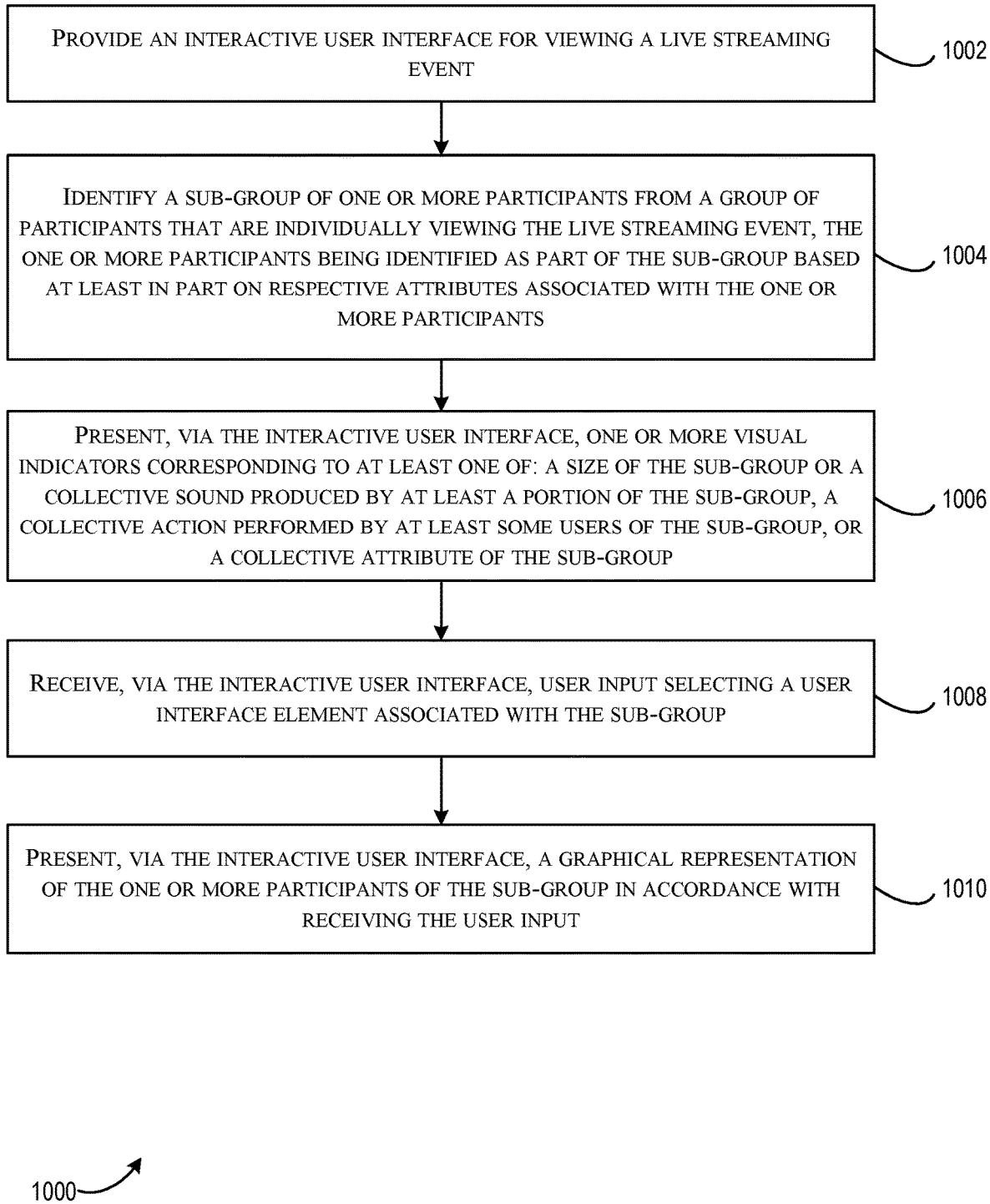
FIG. 10 is a flow diagram illustrating yet another example method for utilizing an interactive interface provided by the interactive interface engine 702 of FIG. 7, in accordance with at least one embodiment.

FIG. 10 is a flow diagram illustrating yet another example method 1000 for utilizing an interactive interface provided by the interactive interface engine 702 of FIG. 7, in accordance with at least one embodiment. A computer-readable storage medium may be utilized having stored thereon computer-executable instructions that, when executed by a processor of a live streaming platform (e.g., the processor(s) 630 of FIG. 6), causes a computing device of the live streaming platform (e.g., service provider computer(s) 610) to perform the method 1000.

The method 1000 may begin at 1002, where an interactive user interface for viewing a live streaming event may be provided.

At 1004, a sub-group of one or more participants may be identified (e.g., by the data processing module 712 of FIG. 7) from a group of participants that are individually viewing the live streaming event. In some embodiments, the one or more participants may be identified as part of the sub-group based at least in part on respective attributes associated with the one or more participants.

At 1006, one or more visual indicators (e.g., the visual indicators 116, 118, 120, 210, and/or 216 of FIGS. 1 and 2) corresponding to at least one of: a size of the sub-group, a collective sound produced by at least a portion of the sub-group, a collective action performed by at least some users of the sub-group, or a collective attribute of the sub-group may be presented (e.g., by the output module 726) via the interactive user interface.

At 1008, user input selecting a user interface element associated with the sub-group may be received (e.g., by the data processing module 712) via the interactive user interface.

At 1010, a graphical representation of the one or more participants of the sub-group may be presented via the interactive user interface in accordance with receiving the user input.

The various embodiments can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or example language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
    providing, by a computing device of a live streaming platform, an interactive user interface for viewing a broadcasted live streaming event;
    identifying, by the computing device, a sub-group of users from a group of users that are individually viewing the broadcasted live streaming event, the sub-group of users being identified as part of a sub-group based at least in part on respective attributes of the sub-group of users;
    obtaining, by the computing device from respective computing devices of sub-group of users, respective video feeds comprising corresponding images depicting a respective user of the sub-group of users;
    generating, by the computing device, a graphical representation for the sub-group depicting a combination of the sub-group of users, the graphical representation for the sub-group being generated based on combining the corresponding images depicting the respective user of the sub-group of users;
    obtaining, by the computing device from the respective computing devices of the sub-group of users, a plurality of audio feeds comprising respective audio captured by the respective computing devices of the sub-group of users;
    generating, by the computing device, collective audio output based at least in part on combining two or more audio feeds of the plurality of audio feeds the two or more audio feeds being combined to generate the collective audio output based at least in part on identifying that each of the two or more audio feeds individually exceed a sound threshold;
    receiving, by the computing device via the interactive user interface, user input selecting the sub-group; and
    presenting, by the computing device via the interactive user interface, at least a portion of the graphical representation generated for the sub-group in accordance with receiving the user input selecting the sub-group and the collective audio output generated based at least in part on combining the two or more audio feeds.

2. The computer-implemented method of claim 1, further comprising:
    receiving, via the interactive user interface, subsequent user input associated with the graphical representation; and
    presenting a different portion of the graphical representation generated for the sub-group based at least in part on the subsequent user input.

3. The computer-implemented method of claim 1, further comprising presenting, via the interactive user interface, a visual representation of a volume of collective audio output generated from respective audio feeds provided by corresponding computing devices of the sub-group of users.

4. The computer-implemented method of claim 1, wherein combining the combination of corresponding images Obtained from the respective video feeds to generate the graphical representation further comprises:
   identifying, from a first video feed of the respective video feeds of the sub-group of users, a first portion of a first image of the first video feed, the first portion of the first image depicting a first user's face;
   identifying, from a second video feed of the respective video feeds of the sub-group of users, a second portion of a second image of the second video feed, the second portion of the second image depicting a second user's face, wherein generating the graphical representation of the sub-group comprises combining: 1) the first portion of the first image obtained from the first video feed and comprising the first user's face, with 2) the second portion of the second image obtained from the second video feed and comprising the second user's face.

5. The computer-implemented method of claim 4, further comprising removing respective backgrounds of the first image and the second image prior to combining the first portion of the first image comprising the first user's face and the second portion of the second image comprising the second user's face.

6. The computer-implemented method of claim 1, wherein combining the two or more plurality of audio feeds to generate the collective audio output further comprises excluding audio feeds of the plurality of audio feeds that failed to exceed the sound threshold.

7. The computer-implemented method of claim 1, wherein combining the two or more plurality of audio feeds to generate the collective audio output further comprises
   selecting the two or more audio feeds from the plurality of audio feeds based at least identifying that the two or more audio feeds include a particular type of sound, wherein generating the collective audio output excludes audio feeds of the plurality of audio feeds that included sound that differs from the two or more audio feeds.

8. The computer-implemented method of claim 1, wherein the portion of the graphical representation generated for the sub-group is presented at a first portion of the interactive user interface, and wherein the method further comprises:
   identifying a particular user of the sub-group, the particular user being identified based at least in part on 1) a motion within a respective video feed and 2) a sound of a respective audio feed corresponding to the particular user;
   in response to identifying the particular user based at least in part on the motion and the sound, presenting, at a second portion of the interactive user interface different from the first portion of the interactive user interface, a video feed corresponding to the particular user.

9. A computing device of a live streaming platform, comprising:
   one or more processors; and
   a memory storing executable instructions that, upon execution by the one or more processors, cause the computing device to, at least:
   provide an interactive user interface for viewing a live streaming event;
   identify a sub-group of users from a group of users that are individually viewing the live streaming event, the sub-group of users being identified as part of a sub-group based at least in part on respective attributes of the sub-group of users;
   obtain, from respective computing devices of the sub-group of users, respective video feeds comprising corresponding images depicting a respective user of the sub-group of users;
   generate a graphical representation for the sub-group depicting a combination of the sub-group of users, the graphical representation for the sub-group being generated based on combining the corresponding images depicting the respective user of the sub-group of users;
   obtain, from the respective computing devices of sub-group of users, a plurality of audio feeds comprising respective audio captured by the respective computing devices of the sub-group of users;
   generate collective audio output based at least in part on combining two or more audio feeds of the plurality of audio feeds, the two or more audio feeds being combined to generate the collective audio output based at least in part on identifying that each of the two or more audio feeds individually exceeds a sound threshold;
   receive, via the interactive user interface, user input selecting the sub-group; and
   present, via the interactive user interface, at least a portion of the graphical representation generated for the sub-group in accordance with receiving the user input and the collective audio output generated based at least in part on combining the two or more audio feeds.

10. The computing device of claim 9, wherein the respective attributes associated with the sub-group of users include at least one of: a location, a demographic, a familial relationship, an affiliation, or a physical attribute.

11. The computing device of claim 9, wherein the portion of the graphical representation is presented for a predetermined period of time in response to receiving the user input.

12. The computing device of claim 9, wherein the memory stores further instructions that, when executed by the one or more processors, causes the computing device to present a visual indicator indicating a number of participants of the sub-group.

13. The computing device of claim 2, wherein the memory stores further instructions that, when executed by the one or more processors, causes the computing device to:
   present, at the interactive user interface, a visual indicator indicating a volume corresponding to the collective audio output; and
   modify a size of the visual indicator based at least in part on changes to the volume corresponding to the collective audio output.

14. The computing device of claim 9, wherein the memory stores further instructions that, when executed by the one or more processors, causes the computing device to:
   identify a particular user of the sub-group, the particular user being identified based at least in part on user data indicating a particular classification;
   obtain a video feed corresponding to the particular user identified; and
   present, via a particular portion of the interactive user interface, the video feed of the particular user.

15. The computing device of claim 9, wherein the memory stores further instructions that, when executed by the one or more processors, causes the computing device to:

provide, via the interactive user interface, a first communication window corresponding to a first group of users comprising at least the sub-group of users viewing the live streaming event;

receive, via additional user input provided at the interactive user interface, identification information for a second group of users; and provide, via the interactive user interface, a second communication window for exchanging messages between the second group of users.

16. The computing device of claim 15, wherein the memory stores further instructions that, when executed by the one or more processors, causes the computing device to:

obtain second images individually depicting a particular user of the second group of users from additional video feeds provided by a plurality of computing devices corresponding to the second group of users; and generate a second graphical representation for the second group of users based at least in part on combining the second images of the second group of users obtained from the additional video feeds, the second graphical representation being generated using the second images to depict the second group of users as if they were physically collocated within the second graphical representation.

17. A computer-readable storage medium having stored thereon computer-executable instructions that, when executed by a processor of a live streaming platform, causes a computing device of the live streaming platform to perform operations comprising:

providing an interactive user interface for viewing a live streaming event;

identifying a sub-group of participants from a group of participants that are individually viewing the live streaming event, the sub-group of participants being identified as part of a sub-group based at least in part on respective attributes associated with the sub-group of participants;

obtaining, from respective computing devices of the sub-group of participants, respective video feeds comprising corresponding images depicting a respective participant of the sub-group of participants;

generating a graphical representation for the sub-group of participants depicting a combination of each of the sub-group of participants, the graphical representation for the sub-group being generated based on combining the corresponding images depicting each of the respective participants of the sub-group;

obtaining, by the computing device from the respective computing devices of the sub-group of participants, a plurality of audio feeds comprising respective audio captured by the respective computing devices of the sub-group of participants;

generating, by the computing device, collective audio output based at least in part on combining two or more audio feeds of the plurality of audio feeds, the two or more audio feeds being combined to generate the collective audio output based at least in part on identifying that each of the two or more audio feeds individually exceeds a sound threshold;

receiving, via the interactive user interface, user input selecting a user interface element associated with the sub-group; and in accordance with receiving the user input selecting the sub-group, presenting, via the interactive user interface, a portion of the graphical representation generated for the sub-group and the collective audio output generated based at least in part on combining the two or more audio feeds.

18. The computer-readable storage medium of claim 17, wherein executing the computer-executable instructions further causes the computing device to present one or more visual indicators, wherein the one or more visual indicators comprises a visual indicator indicating a number of participants within the sub-group, and wherein the visual indicator is modified over time to indicate changes in the number of participants of the sub-group.

19. The computer-readable storage medium of claim 17, wherein the computing device is configured to perform further operations comprising:

monitoring group participation during the live streaming event;

storing changes in an amount of participants corresponding to the sub-group during the live streaming event based at least in part on the monitoring; and presenting, via the interactive user interface, a subsequent playback of the live streaming event, wherein the changes in the amount of participants of the sub-group are visually, presented as part of the subsequent playback.

20. The computer-readable storage medium of claim 17, wherein the computing device is configured to perform further operations comprising:

obtaining, by the computing device from corresponding computing devices of a group of users, i) corresponding video feeds comprising respective images depicting respective users of the group of users, and ii) a plurality of graphical representations generated from different subsets of the corresponding video feeds, the plurality of graphical representations corresponding to a plurality of sub-groups of participants;

storing the corresponding video feeds and corresponding graphical representations corresponding to the plurality of sub-groups of participants;

subsequent to conclusion of the live streaming event, presenting, a subsequent playback of the live streaming event;

presenting a second graphical representation of the plurality of graphical representations, the second graphical representation corresponding to a second sub-group of participants of the plurality of sub-groups of participants;

receiving, via the interactive user interface during the subsequent playback of the live streaming event, subsequent user input indicating an interaction with the second graphical representation corresponding to the second sub-group of participants; and in response to receiving the subsequent user input, presenting, via the interactive user interface, a corresponding portion of the second graphical representation.

* * * * *